US012795507B2

(12) United States Patent
Ishii

(10) Patent No.: US 12,795,507 B2
(45) Date of Patent: Nov. 10, 2026

(54) ACCESS CONTROL FOR STORE AND FORWARD OPERATION

(71) Applicant: Sharp Kabushiki Kaisha, Sakai City (JP)

(72) Inventor: Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 296 days.

(21) Appl. No.: 18/435,768

(22) Filed: Feb. 7, 2024

(65) Prior Publication Data

US 2025/0254601 A1 Aug. 7, 2025

(51) Int. Cl.
*H04W 48/02* (2009.01)
*H04B 7/185* (2006.01)

(52) U.S. Cl.
CPC ........ *H04W 48/02* (2013.01); *H04B 7/18513* (2013.01)

(58) Field of Classification Search
None
See application file for complete search history.

(56) References Cited

U.S. PATENT DOCUMENTS

2013/0262171 A1* 10/2013 Solodko ........... G06Q 10/06311 705/7.18
2023/0237205 A1* 7/2023 Grobbel .................... H04L 9/14 726/26

FOREIGN PATENT DOCUMENTS

CN 116528401 A 8/2023

OTHER PUBLICATIONS

U.S. Appl. No. 18/435,791, filed Feb. 2024, Ishii.

(Continued)

*Primary Examiner* — Frantz Bataille
(74) *Attorney, Agent, or Firm* — ScienBiziP, P.C.

(57) ABSTRACT

A wireless terminal that communicates with an access node on a satellite via a service link comprises receiver circuitry and processor circuitry. The receiver circuitry is configured to receive, from the access node, store and forward (S&F) information comprising (1) S&F operation mode status indicating that the access node provides S&F service, and (2) access control information, the access control information for the S&F service. The processor circuitry is configured, based on the S&F information, to make a decision whether an access attempt is allowed. The S&F service comprises storing and forwarding of user data.

10 Claims, 14 Drawing Sheets

(56) References Cited

OTHER PUBLICATIONS

3GPP TS 24.501 V18.5.0 (Dec. 2023), 3rd Generation Partnership Project; Technical Specification Group Core Network and Terminals; Non-Access-Stratum (NAS) protocol for 5G System (5GS); Stage 3; (Release 18).
3GPP TS 33.401 V17.4.0 (Jun. 2023) 3rd Generation Partnership Project; Technical Specification Group Services and System Aspects; 3GPP System Architecture Evolution (SAE); Security architecture (Release 17).
3GPP TS 33.501 V18.4.0 (Dec. 2023) 3rd Generation Partnership Project; Technical Specification Group Services and System Aspects; Security architecture and procedures for 5G system (Release 18).
3GPP TS 36.331 V18.0.0 (Dec. 2023), 3rd Generation Partnership Project; Technical Specification Group Radio Access Network; Evolved Universal Terrestrial Radio Access (E-UTRA); Radio Resource Control (RRC); Protocol specification (Release 18).
3GPP TS 38.331 V18.0.0 (Dec. 2023), 3rd Generation Partnership Project; Technical Specification Group Radio Access Network; NR; Radio Resource Control (RRC) protocol specification (Release 18).

* cited by examiner

ACCESS CONTROL FOR STORE AND FORWARD OPERATION

TECHNICAL FIELD

The technology relates to wireless communications, and particularly to wireless communications between wireless terminals and nodes of non-terrestrial networks e.g., nodes hosted by satellites.

BACKGROUND

A radio access network typically resides between wireless devices, such as user equipment (UEs), mobile phones, mobile stations, or any other device having wireless termination, and a core network. Example of radio access network types includes the GERAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of an access node or base station may include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG-RAN, Next Generation Radio Access Network, and 5GC, 5G Core Network. As shown, NG-RAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE, and is connected via the NG interface to the 5GC. The 5G NR, New Radio, gNB is connected to AMF, Access and Mobility Management Function, and UPF, User Plane Function, in the 5GC, 5G Core Network.

In recent cellular mobile communication systems, satellite communication networks and technologies, e.g., a non-terrestrial network, NTN, are being integrated to the conventional cellular networks on the ground, e.g., to a terrestrial network, TN. Devices, such as User Equipment (UE) or Internet of Things (IoT) terminals, collectively referred to herein as "wireless terminals", may receive telecommunication services from one or more satellites in orbits, where each of such satellites is capable of serving cells serving the devices through a wireless link sometimes known as a "service link". In parallel, each of such satellites is connected wirelessly by a link sometimes known as a "feeder link" to a transmitter/receiver on the ground, e.g., to a ground station or gateway, which enables the satellite to be connected with backend network, such as core networks on the ground.

The $3^{rd}$ Generation Partnership Project (3GPP) currently specifies NTN architectures and services, assuming that the satellite-gateway link, e.g., the feeder link, is being connected when a satellite serves a cell to devices. However, this assumption may not always be true, especially when the satellite is flying over an ocean where no gateways are available. In 3GPP, Release 19 is being proposed and discussed to support "Store and Forward" (S&F) operation for delay-tolerant communication services. S&F operation is an operation mode of a 5G system with satellite-access, where the 5G system can provide some level of service, e.g., in storing and forwarding the data, when satellite-gateway connectivity is intermittently/temporarily unavailable, e.g., to provide communication service for devices under satellite coverage without a simultaneous active feeder link connection to the ground segment. This is particularly relevant for delay-tolerant services.

What is needed are, e.g., methods, apparatus, and/or techniques to facilitate "Store and Forward" (S&F) operations, including access control schemes to satellites comprising store and forward capabilities.

SUMMARY

In one of its example aspects the technology disclosed herein concerns a wireless terminal that communicates with an access node on a satellite via a service link the access node being connected wirelessly to a core network via a feeder link. In a basic example embodiment and mode, the wireless terminal comprises receiver circuitry and processor circuitry. The receiver circuitry is configured to receive, from the access node, store and forward (S&F) information comprising (1) S&F operation mode status indicating that the access node provides S&F service, and (2) access control information, the access control information for the S&F service. The processor circuitry is configured, based on the S&F information, to make a decision whether an access attempt is allowed. The S&F service comprises storing and forwarding of user data. Methods of operating such wireless terminals are also provided.

In another of its example aspects the technology disclosed herein comprises an access node on a satellite. The access node communicates with a wireless terminal via a service link and with a core network wirelessly via a feeder link. In a basic example embodiment and mode, the access node comprises processor circuitry and transmitter circuitry. The processor circuitry is configured to generate store and forward (S&F) information comprising (1) S&F operation mode status indicating that the access node provides S&F service, and (2) access control information, the access control information for the S&F service. The transmitter circuitry is configured to transmit the S&F information to the wireless terminal. The S&F service comprises storing and forwarding of user data while the feeder link is unavailable for the access node. The S&F information is configured for use by the wireless terminal to make a decision whether an access attempt is allowed for the wireless terminal. Methods of operating such access nodes are also provided.

In another of its example aspects the technology disclosed herein comprises a wireless terminal that communicates with a first access node comprises receiver circuitry and processor circuitry. The receiver circuitry is configured to receive, from the first access node, a message comprising (1)

an instruction to enter an inactive state, and (2) context transfer status indicating that a security context of the wireless terminal is transferred to at least one target access node. The processor circuitry is configured to transition, based on the instruction, to the inactive state; store the security context, and; upon camping on a cell served by a second access node, determine, based on the context transfer status, whether the security context is transferred to the cell. Methods of operating such wireless terminals are also provided.

In yet another of its example aspects the technology disclosed herein comprises an access node that communicates with a wireless terminal. In a basic example embodiment and mode, the access terminal comprises processor circuitry and transmitter circuitry. The processor circuitry is configured to generate a message comprising (1) an instruction to enter an inactive state, and (2) context transfer status indicating that a security context of the wireless terminal is transferred to at least one target access nodes. The transmitter circuitry is configured to transmit the message to the wireless terminal. The context transfer status is configured to be used by the wireless terminal to determine, upon camping on a cell, whether the security context is transferred to the cell. Methods of operating such access nodes are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 11, including both

DETAILED DESCRIPTION

Figure 1:
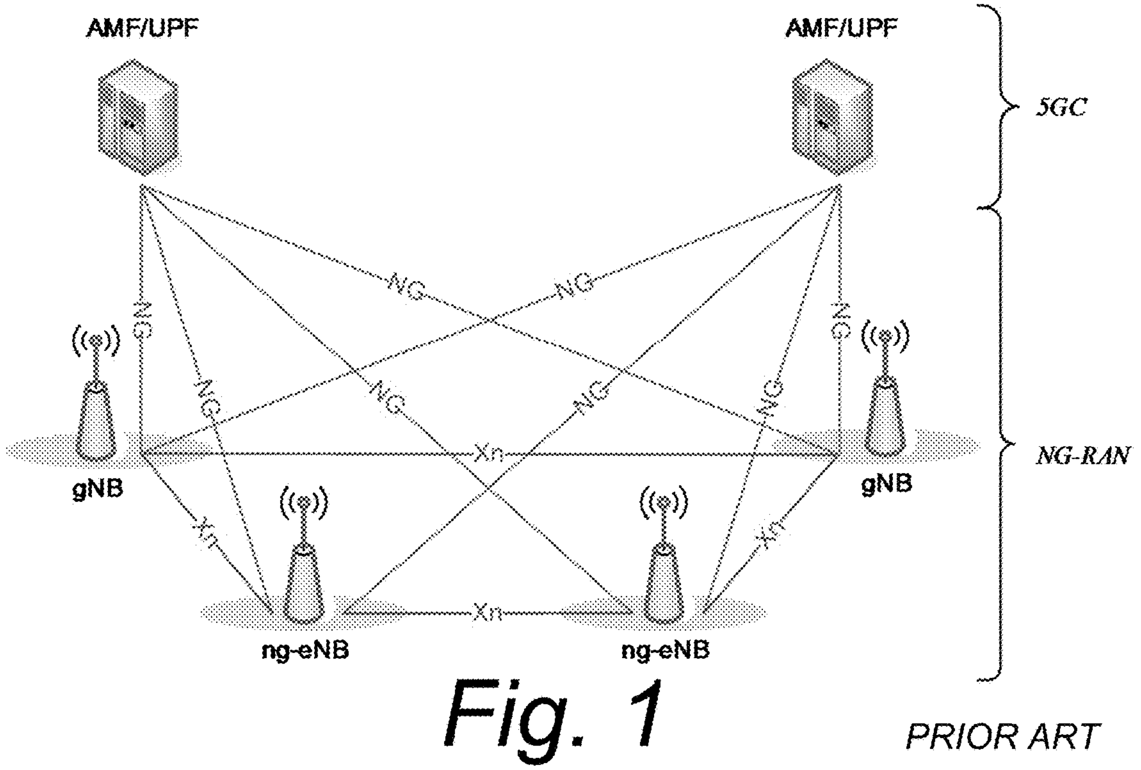
Fig. 1 PRIOR ART
FIG. 1 is a diagrammatic view of overall architecture for a 5G New Radio system.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether such computer or processor is explicitly shown.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NG-RAN.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, a "core network" may comprise one or more core network nodes or servers. A core network, CN, may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, core network (CN) 108 may comprise one or more management entities, which may be an Access and Mobility Management Function, AMF.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology. An access node may include, for example, one or more types of relay nodes.

Figure 2:
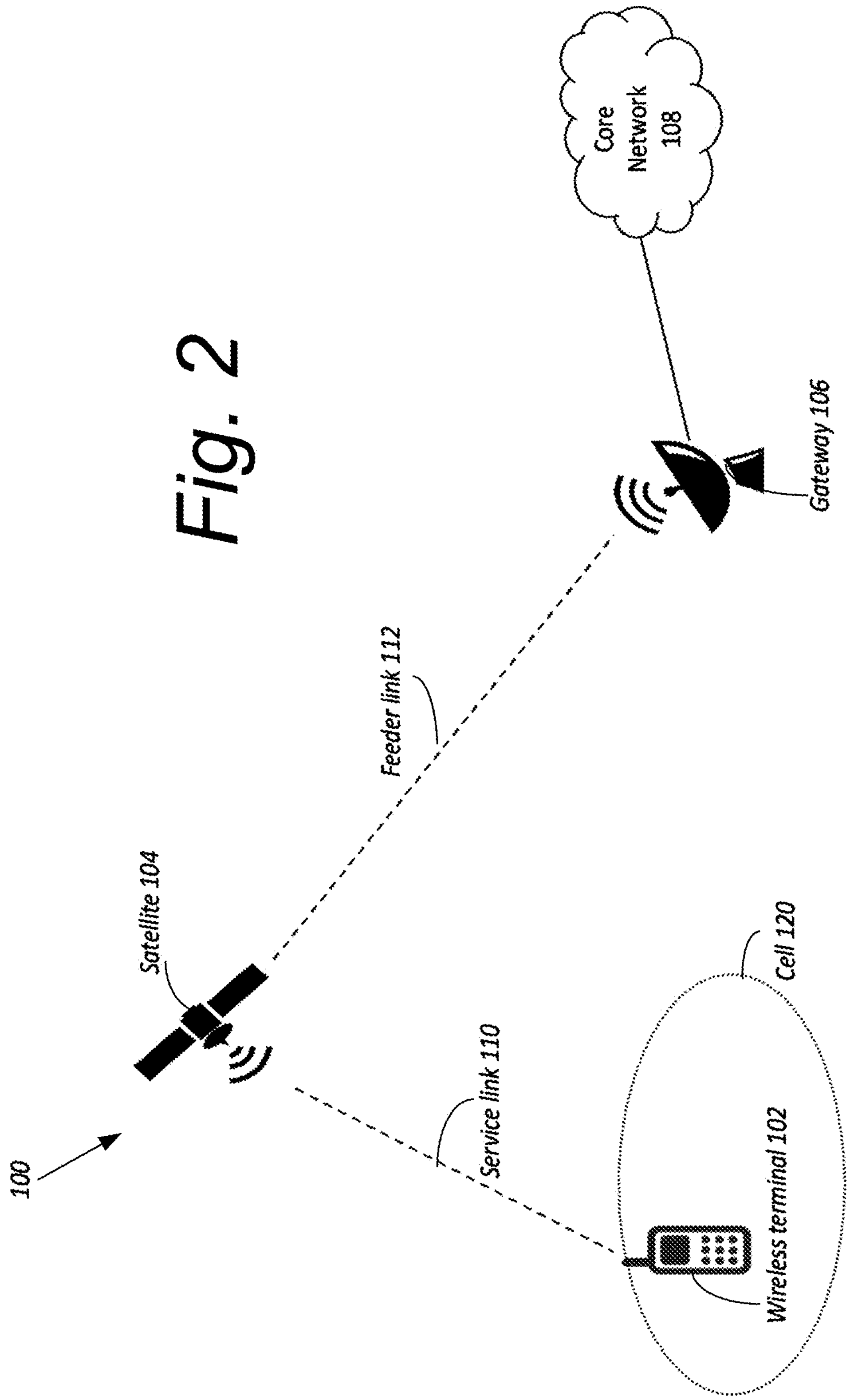
FIG. 2 is a diagrammatic view of a satellite telecommunication system wherein wireless terminal is in a coverage of cell served by satellite via service link.

FIG. 2 shows a system diagram of a satellite telecommunication system 100, wherein wireless terminal 102, such as user equipment, UE, or an Internet of Things, IoT, device, is in a coverage of cell 120 served by satellite 104 via service link 110. Satellite 104 is wirelessly connected to gateway 106 via feeder link 112. Gateway 106 is connected to core network 108. Satellite 104 may be equipped with elements and functions to support the S&F operation, which is described in detail below.

Figure 3:
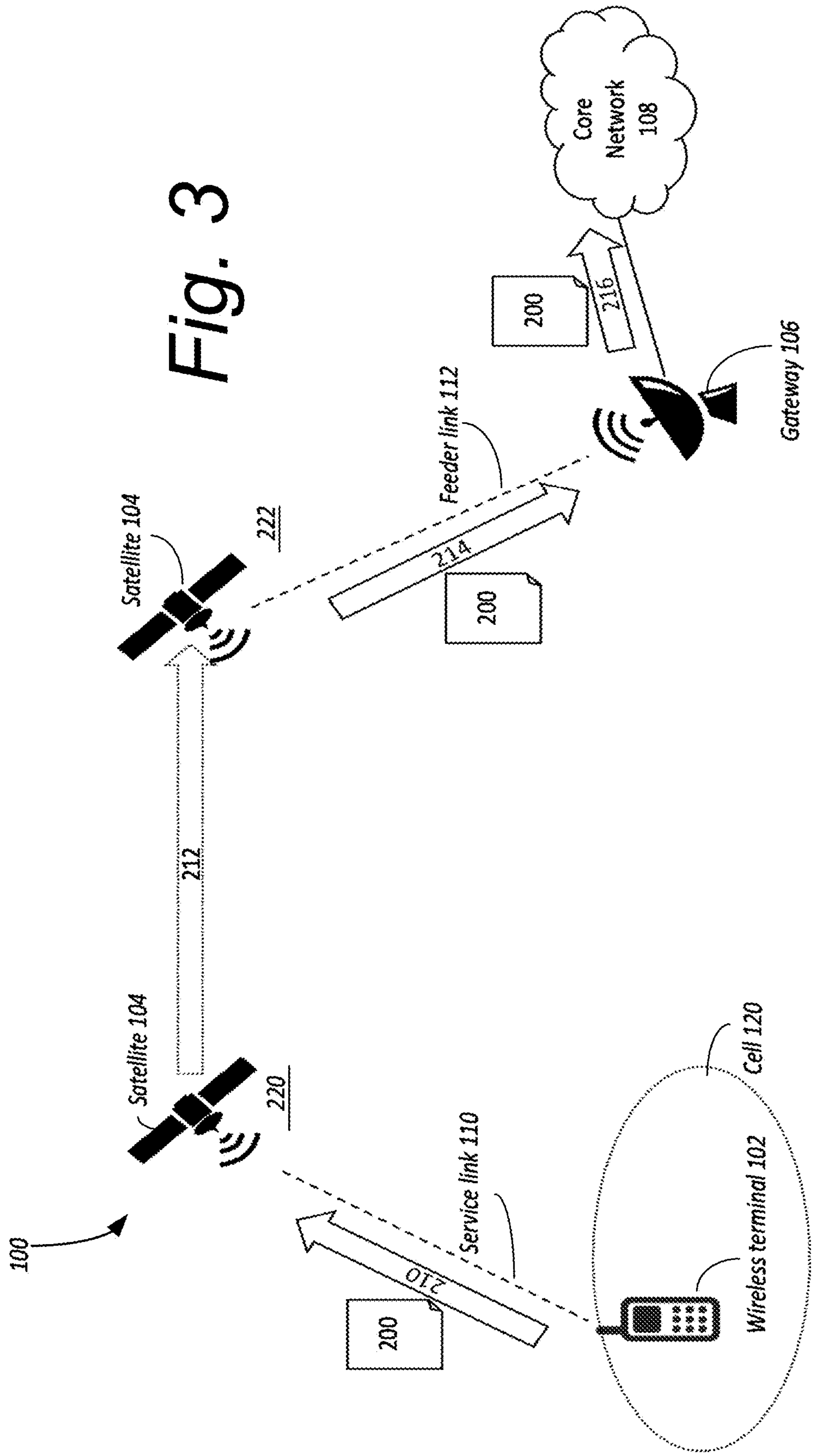
FIG. 3 is a diagrammatic view of the satellite telecommunication system of FIG. 2 which illustrates a first example scenario of store and forward, S&F, operation in which delay-tolerant user data, S&F data, is to be sent from a wireless terminal to a core network.

FIG. 3 illustrates one example scenario of the S&F operation in the system of FIG. 2, where delay-tolerant user data 200, also as S&F data, is to be sent from wireless terminal 102 to core network 108. In the scenario of FIG. 3, wireless terminal 102, when attempting to send user data 200, is in the coverage of cell 120 served by satellite 104. At this moment, satellite 104 is located at location 220, where no connection to a gateway is available. As illustrated by 210 of FIG. 3, wireless terminal 102 sends user data 200 to satellite 104 via service link 110. With lack of connectivity to a gateway, satellite 104 may store user data 200 in its own storage. Satellite 104 then moves to location 222 as depicted by arrow 212, where satellite 104 is able to find gateway 106 and establish feeder link 112. After feeder link 112 is established, satellite 104 retrieves user data 200 stored in the storage and sends it over feeder link 112 as depicted by 214. Gateway 106 then receives user data 200 and forwards it to core network 108 as shown by 216.

Figure 4:
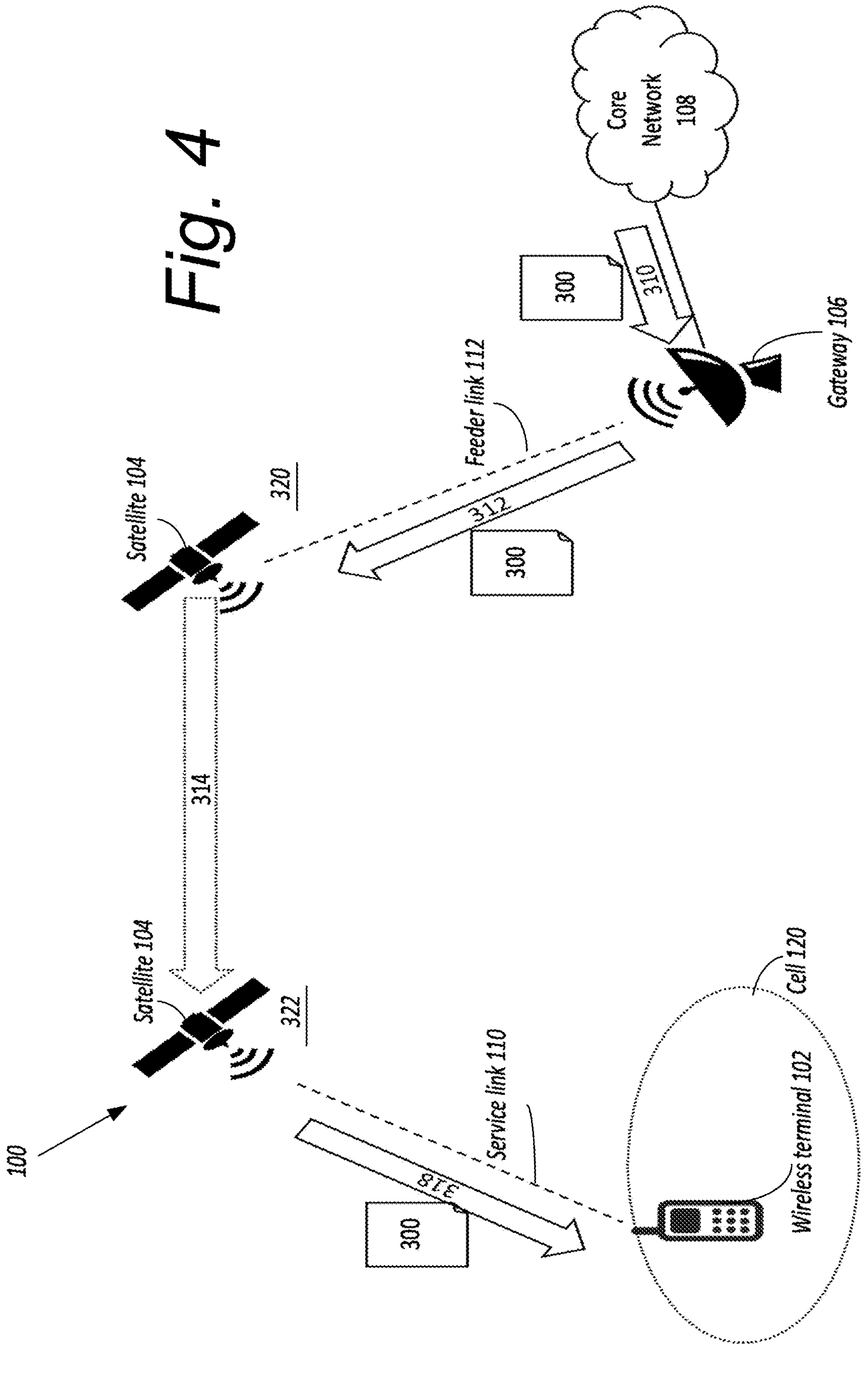
FIG. 4 is a diagrammatic view of the satellite telecommunication system of FIG. 2 which illustrates a second example scenario of S&F operation in which delay-tolerant user data, S&F data, is to be sent to a wireless terminal from a core network.

FIG. 4 shows another example scenario of the S&F operation in the system of FIG. 2, where delay-tolerant user data 300 (S&F data) is to be sent to wireless terminal 102 from core network 108. As illustrated by 310, core network sends user data 300 to gateway 106, which forwards user data 300 to satellite 104 at location 320 via feeder link 112 as shown by 312. Core network 108 and/or satellite 104 may recognize that wireless terminal 102 is currently not reachable but will be reachable when satellite 104 moves to location 322 where there is no gateway available. This may be possible, for example, if core network 108 predicts the location of the wireless terminal by subscription data and/or the historical data of the wireless terminal's locations. Satellite 104 may then store user data 300 in its own storage until reaches location 322, where feeder link 112 is no longer available. User data 300, as depicted by 318, is sent, via service link 110, to wireless terminal 102 which is in the coverage of cell 120.

Figure 5:
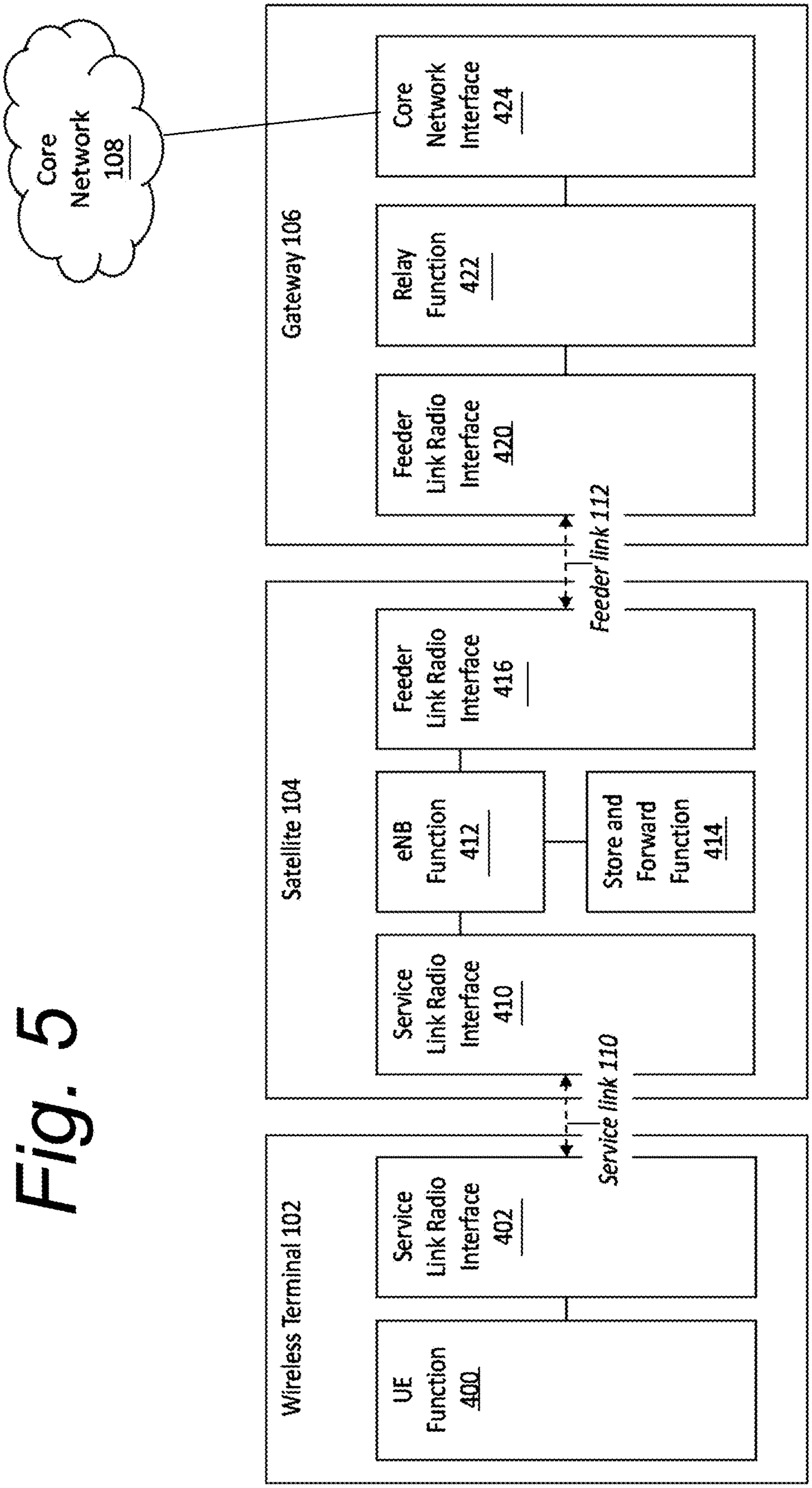
FIG. 5 is an example a diagrammatic view of the satellite telecommunication system of FIG. 2 showing various example functional aspects of a wireless terminal, a satellite, and a gateway.

FIG. 5 is an example functional diagram of wireless terminal 102, satellite 104, and gateway 106. Wireless terminal 102 may comprise UE function 400 and service link radio interface 402. UE function 400 may comprise user applications for generating and consuming user data, a user plane protocol stack sending/receiving user data to/from core network 108, and a control plane protocol stack for management of radio/network connections with satellite 104 and/or core network 108. Service link radio interface 402 may comprise a transmitter and a receiver to transmit/receive signals wirelessly to/from satellite 104 via service link 110. Satellite 104 may comprise service link radio interface 410, eNode B (eNB) function 412, store and forward function 414, and feeder link radio interface 416. Service link radio interface may comprise a transmitter and a receiver to transmit/receive signals wirelessly to/from wireless terminal 102 via service link 110. eNB function 412 may be responsible for serving cell 120 of FIG. 2, FIG. 3 and FIG. 4, managing access stratum (AS) connections with wireless terminal 102, managing logical connections with core network 108, and handling user data for wireless terminal 102. Store and forward function 414 may (i) store user data received from wireless terminal 102 when feeder link 112 is not available, (ii) retrieve and forward the user data from the wireless terminal 102 when feeder link 112 become available, (ii) store user data received from core network through gateway 106 when wireless terminal 102 is not reachable, and (iv) retrieve and forward the user data from the core network 108 when wireless terminal becomes reachable. Feeder link radio interface 416 may comprise a transmitter and a receiver to transmit/receive signals wirelessly to/from gateway 106 via feeder link 112. Gateway 106 may behave as a relay between satellite 104 and core network 106, and may comprise feeder link radio interface 420, relay function 422, and core network interface 424. Feeder link radio interface 420 may further comprise a transmitter and a receiver to transmit/receive signals wirelessly to/from satellite 104 via feeder link 112. Feeder link radio interface 420 may comprise a transmitter and a receiver to transmit/receive signals wirelessly to/from satellite 104 via feeder link 112. Relay function 422 may relay signals/information from satellite 104 to core network 108 and vice versa. Core network interface 424 may comprise a transmitter and a receiver to transmit/receive signals wirelessly to/from core network 108. The link between gateway 106 and core network 108 may be a wired connection or a wireless connection.

Example Embodiment: Access Control for Store and Forward Operation

As shown in FIG. 3 or FIG. 4, the feeder link of a satellite may not always be available, due to the location and/or the orbit of the satellite. When the feeder link is unavailable, the satellite may perform the store and forward operation as disclosed above. During this operation, the satellite may not be able to honor user data traffic from all the devices in its coverage area, and thus may need to limit use of the store and forward operation to selected users, applications and/or circumstances. This limitation may be due to the size of the storage in the satellite, e.g., the storage in store and forward function 414 of FIG. 5, or may be due to subscriptions and billing, e.g., only subscribed/paid users can use the operation. Therefore, the present embodiment and mode of the technology disclosed herein is aimed to provide access control schemes for devices to that access to a cell served by a satellite while the feeder link is unavailable.

The generalized concept of this access control may be expressed in such a way that (1) the satellite, when in the store and forward operation mode, may inform a device under its coverage of this operation mode, (2) the satellite may provide conditions under which the device can use services offered by the operation mode, wherein user data for the device may be stored in the satellite temporarily, and (3) the device may evaluate the conditions and determine if it is allowed to use the services.

As the first implementation, said generalized concept may be realized by enhancements of Unified Access Control (UAC) per 3GPP TS 24.501 v18.4.0 to limit access attempts from devices. See, e.g., 3GPP TS 24.501 v18.4.0, "System architecture for the 5G System (5GS), incorporated herein by reference.

Figure 6:
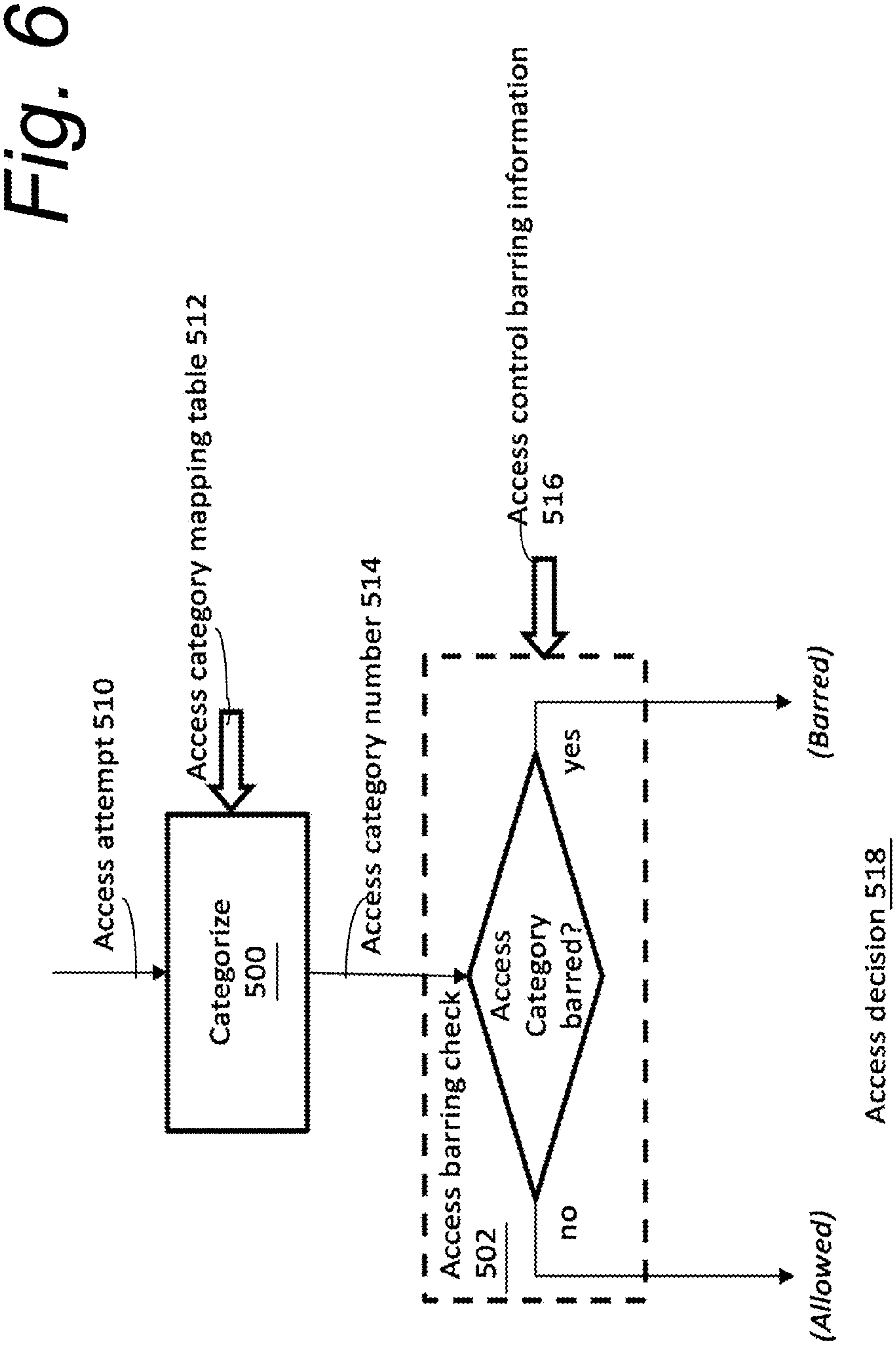
FIG. 6 is flowchart depicting example acts or steps comprising a high-level unified access control procedure for a wireless terminal of an example embodiment and mode.

A high-level view of the unified access control procedure for a wireless terminal is shown in FIG. 6. The procedure of FIG. 6 may be invoked when an event of an access attempt occurs in the wireless terminal. An access attempt is an action triggered by the wireless terminal to access the network for initiating services in an idle state, e.g., RRC_IDLE, or an inactive state, e.g., RRC_INACTIVE. An example of such an action may include, but is not limited to, an initiation of user data transmission, an initiation of signaling data transmission/reception, e.g., network registration, or a response to a paging, as depicted by act 510 of FIG. 6. When such an access attempt occurs, as depicted by act 510 of FIG. 6, as act 500 the wireless terminal may categorize the attempt using access category mapping table 512. In one example implementation, access category mapping table 512 may be pre-configured, e.g. programmed in the wireless terminal's software instructions, loaded in the wireless terminal's memory in factory or any other configuration schemes to make the mapping table available in early time. In another example implementation, access category mapping table 512 is configured by the network, such as by core network 108 of FIG. 2, FIG. 3, FIG. 4 or FIG. 5. The categorization of act 500 may produce an access category number, as depicted by act 514. The wireless terminal may then, as act 502, further perform an access barring check to determine, based on access category number 514, whether the access attempt of act 510 is barred at this moment. To do so, the wireless terminal may make use of access control barring information 516 broadcasted by a current serving cell via system information. Access control barring information 516 may indicate access categories that are barred or allowed in the serving cell. Access barring check of act 502 may produce an access decision of act 518, indicating whether access attempt of act 510 is allowed or barred.

Figure 7:
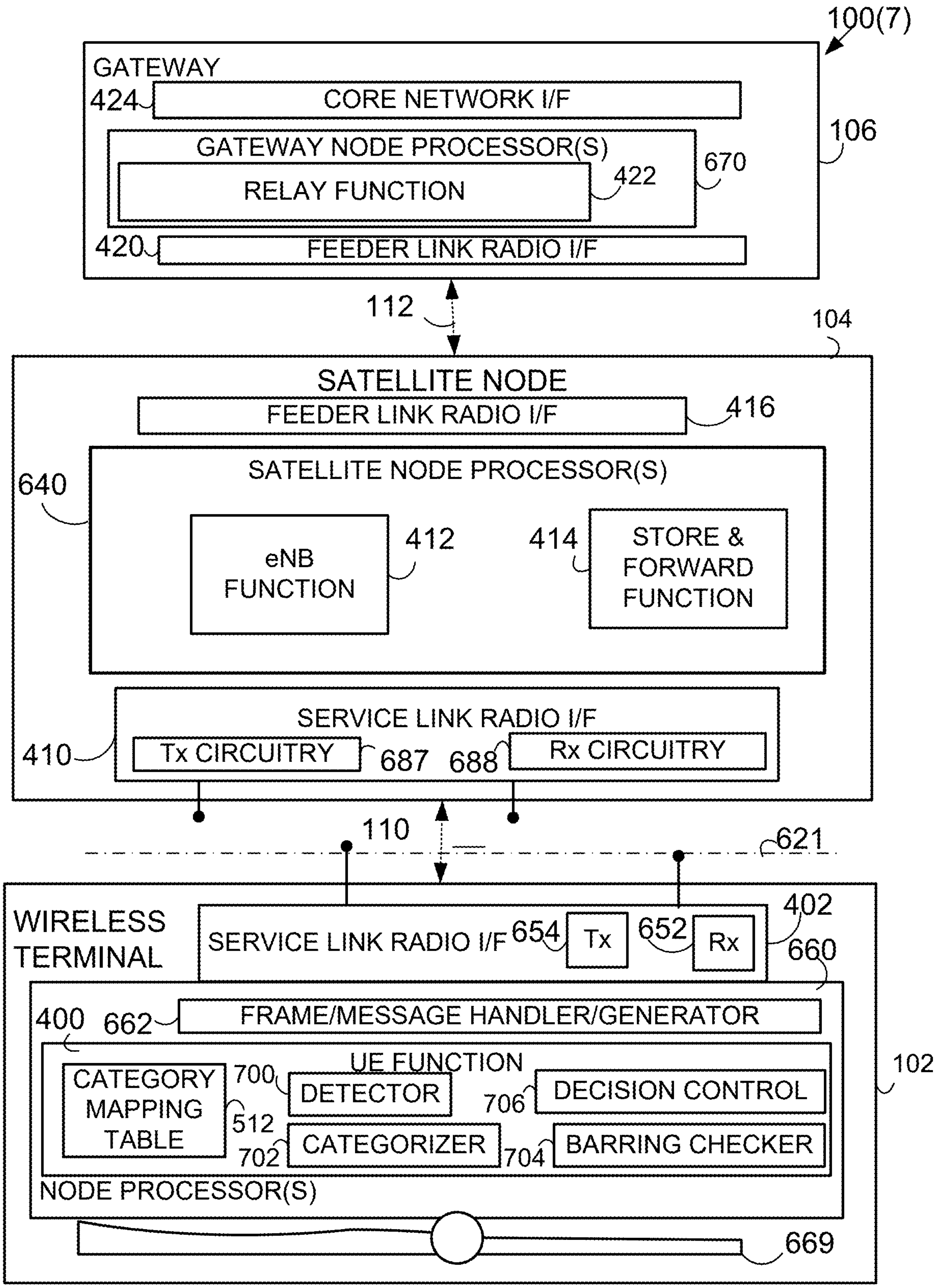
FIG. 7 is a schematic view showing in more detail an example satellite telecommunication system suitable for implementation of a first example embodiment and mode.

FIG. 7 shows in more detail an example satellite telecommunication system 100(7) suitable for implementation of the first example embodiment and mode. The satellite telecommunication system 100(7) includes wireless terminal 102, which may be user equipment, UE, or an Internet of Things, IoT, device; satellite 104; and gateway 106. As explained previously, satellite telecommunication system 100(7) is in a coverage of cell 120 served by satellite 104 via service link 110; satellite 104 is wirelessly connected to gateway 106 via feeder link 112; and gateway 106 is connected to core network 108. Satellite 104 may be equipped with elements and functions to support the S&F operation, which is described in detail below. The wireless terminal 102 communicates over a radio or air interface 621 with satellite 104 on the service link 110.

Satellite 104 may also be referred to herein as a "network node", or "access node", or "satellite node". As previously mentioned, satellite 104 comprises service link radio interface 410, eNode B (eNB) function 412, and feeder link radio interface 416. The service link radio interface 410 may comprise satellite service link radio transmitter circuitry 687 and satellite service link radio receiver circuitry 688. Satellite processor circuitry, e.g., satellite processor(s) 640, may perform many functionalities for its resident node, as understood by those skilled in the art. For example, satellite processor(s) 640 may execute coded instructions stored on tangible media, and/or comprise circuitry, to realize or perform the functions of eNode B (eNB) function 412 and store and forward function 414, e.g., the processor circuitry of satellite processor(s) 640 may execute coded instructions stored on tangible media for performing eNode B (eNB) function 412 and store and forward function 414.

The wireless terminal 102 may comprise wireless terminal transceiver circuitry, also known as the service link radio interface 402. The wireless terminal transceiver circuitry 402 may in turn comprise wireless terminal receiver circuitry 652 and wireless terminal transmitter circuitry 654. The transceiver circuitry 650 may include antenna (e) for wireless transmission. The wireless terminal transmitter circuitry 654 may include, e.g., amplifier(s), modulation circuitry and other conventional transmission equipment. The wireless terminal receiver circuitry 652 may comprise, e.g., amplifiers, demodulation circuitry, and other conventional receiver equipment.

FIG. 7 further shows wireless terminal 102 as also comprising wireless terminal processor circuitry, e.g., one or more wireless terminal processor(s) 660. In example implementation, the wireless terminal processor(s) 660 comprises frame/message generator/handler 662. As is understood by those skilled in the art, in some telecommunications system messages, signals, and/or data are communicated over a radio or air interface using one or more "resources", e.g., "radio resource(s)". The wireless terminal processor(s) 660 may perform many functionalities for its wireless terminal, as understood by those skilled in the art.

For performing example functions germane to the example embodiment and mode of the technology disclosed herein, the wireless terminal processor(s) 660 may further comprise UE function 400. In an example implementation, UE function 400 may execute coded instructions stored on tangible media, and/or may comprise circuitry, for serving as access detector 700, access categorizer 702, access barring checker 704, and access decision controller 706. The access detector 700 executes, at least in part, act 510 described above. The access categorizer 702 executes, at least in part, act 500 described above, having access to access mapping table 512. The access barring checker 704 executes, at least in part, act 502 described above, using e.g., access barring information 516. The access decision controller 706 executes, at least in part, act 518 described above.

Wireless terminal 20 may also comprise interfaces 669, including one or more user interfaces. Such user interfaces may serve for both user input and output operations and may comprise (for example) a screen such as a touch screen that can both display information to the user and receive information entered by the user. User interface 69 may also include other types of devices, such as a speaker, a microphone, or a haptic feedback device, for example.

The wireless terminal 102 may also communicate over the radio or wireless interface 621 with an unillustrated radio access network. Depending on system and circumstances of operation, the wireless terminal 102 may wirelessly communicate with one or more access nodes of one or more radio access networks.

Communication with the wireless terminal over the radio interface occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

FIG. 7 shows the gateway 106 of the satellite telecommunication system 100(7) as comprising feeder link radio interface 420, relay function 422, and core network interface 424. FIG. 7 further shows the gateway 106 as comprising gateway processor circuitry, e.g., one or more gateway processor(s) 670 which may execute coded instructions stored on tangible media, and/or which may comprise circuitry, to realize the or perform the relay function 422.

An example configuration of access category mapping table 512 of the present embodiment is shown in Table 1, which is based on Table 4.5.2.2 Mapping table for access categories disclosed in 3GPP TS 24.501 v18.4.0 with an additional rule (Rule #4.1) for deriving the access category number, e.g., N, an integer uniquely assigned for S&F data, for an access attempt in S&F operation mode. The access category mapping table 512 may be pre-configured to wireless terminal 102, or configured to wireless terminal 102 by core network 108.

TABLE 1

| Rule # | Type of access attempt | Requirements to be met | Access Category |
|---|---|---|---|
| 1 | Response to paging or NOTIFICATION over non-3GPP access; 5GMM connection management procedure initiated for the purpose of transporting an LPP message without an ongoing 5GC-MO-LR procedure; Access attempt to handover of ongoing MMTEL voice call, MMTEL video call or SMSoIP from non-3GPP access; or Access attempt upon receipt of "call-pull-initiated" indication from the upper layers (see 3GPP TS 24.174 [13D]) | Access attempt is for MT access, or handover of ongoing MMTEL voice call, MMTEL video call or SMSoIP from non-3GPP access; or Access attempt is made upon receipt of "call-pull-initiated" (3GPP TS 24.174 [13D]) | 0 (=MT_acc) |
| 2 | Emergency | UE is attempting access for an emergency session (NOTE 1, NOTE 2) | 2 (=emergency) |

TABLE 1-continued

| Rule # | Type of access attempt | Requirements to be met | Access Category |
|---|---|---|---|
| 3 | Access attempt for operator-defined access category | UE stores operator-defined access category definitions valid in the current PLMN as specified in subclause 4.5.3, and access attempt is matching criteria of an operator-defined access category definition | 32-63 (=based on operator classification) |
| 3.1 | Access attempt for MO exception data | UE is in NB-N1 mode and allowed to use exception data reporting (see the ExceptionDataReportingAllowed leaf of the NAS configuration MO in 3GPP TS 24.368 [17] or the USIM file $EF_{NASCONFIG}$ in 3GPP TS 31.102 [22]), and access attempt is for MO data or for MO signalling initiated upon receiving a request from upper layers to transmit user data related to an exceptional event. | 10 (=MO exception data) |
| 4 | Access attempt for delay tolerant service | (a) UE is configured for NAS signalling low priority or UE supporting S1 mode is configured for EAB (see the "ExtendedAccessBarring" leaf of NAS configuration MO in 3GPP TS 24.368 [17] or 3GPP TS 31.102 [22]) where "EAB override" does not apply, and (b): the UE received one of the categories a, b or c as part of the parameters for unified access control in the broadcast system information, and the UE is a member of the broadcasted category in the selected PLMN or RPLMN/equivalent PLMN (NOTE 3, NOTE 5, NOTE 6, NOTE 7, NOTE 8) | 1 (=delay tolerant) |
| 4.1 | Access attempt for S&F services | UE is configured for S&F and UE received S&F operation indication in the broadcast system information. | N (=S&F data) |
| 5 | MO MMTel voice call; or MT MMTel voice call | Access attempt is for MO MMTel voice call or MT MMTel voice call or for NAS signalling connection recovery during ongoing MO MMTel voice call or ongoing MT MMTel voice call (NOTE 2) | 4 (=MO MMTel voice) |
| 6 | MO MMTel video call; or MT MMTel video call | Access attempt is for MO MMTel video call or MT MMTel video call or for NAS signalling connection recovery during ongoing MO MMTel video call or ongoing MT MMTel video call (NOTE 2) | 5 (=MO MMTel video) |

TABLE 1-continued

| Rule # | Type of access attempt | Requirements to be met | Access Category |
|---|---|---|---|
| 7 | MO SMS over NAS or MO SMSoIP; or MT SMSOIP | Access attempt is for MO SMS over NAS (NOTE 4) or MO SMS over SMSoIP transfer or MT SMS over SMSoIP or for NAS signalling connection recovery during ongoing MO SMS or SMSoIP transfer or ongoing MT MMTel video call (NOTE 2) | 6 (=MO SMS and SMSoIP) |
| 7.1 | MO IMS registration related signalling | Access attempt is for MO IMS registration related signalling (e.g. IMS initial registration, re-registration, subscription refresh) or for NAS signalling connection recovery during ongoing procedure for MO IMS registration related signalling (NOTE 2a) | 9 (=MO IMS registration related signalling) |
| 8 | UE NAS initiated 5GMM specific procedures | Access attempt is for MO signalling | 3 (=MO_sig) |
| 8.1 | Mobile originated location request | Access attempt is for mobile originated location request (NOTE 9) | 3 (=MO_sig) |
| 8.2 | Mobile originated signalling transaction towards the PCF | Access attempt is for mobile originated signalling transaction towards the PCF (NOTE 10) | 3 (=MO_sig) |
| 8.3 | Access attempt for RAN timing synchronization | Access attempt is for mobile originated signalling for the reconnection to the network due to RAN timing synchronization status change | 3 (=MO_sig) |
| 9 | UE NAS initiated 5GMM connection management procedure or 5GMM NAS transport procedure | Access attempt is for MO data | 7 (=MO_data) |
| 10 | An uplink user data packet is to be sent for a PDU session | No further requirement is to be met | 7 (=MO_data) |

TABLE 1-continued

| Rule # | Type of access attempt | Requirements to be met | Access Category |
|---|---|---|---|
| | with suspended user-plane resources | | |

(NOTE 1):
This includes 5GMM specific procedures while the service is ongoing and 5GMM connection management procedures required to establish a PDU session with request type = "initial emergency request" or "existing emergency PDU session", or to re-establish user-plane resources for such a PDU session. This further includes the service request procedure initiated with a SERVICE REQUEST message with the Service type IE set to "emergency services fallback".
(NOTE 2):
Access for the purpose of NAS signalling connection recovery during an ongoing service as defined in subclause 4.5.5, or for the purpose of NAS signalling connection establishment following fallback indication from lower layers during an ongoing service as defined in subclause 4.5.5, is mapped to the access category of the ongoing service in order to derive an RRC establishment cause, but barring checks will be skipped for this access attempt.
(NOTE 2a):
Access for the purpose of NAS signalling connection recovery during an ongoing procedure for MO IMS registration related signalling as defined in subclause 4.5.5, or for the purpose of NAS signalling connection establishment following fallback indication from lower layers during an ongoing procedure for MO IMS registration related signalling as defined in subclause 4.5.5, is mapped to the access category of the MO IMS registration related signalling in order to derive an RRC establishment cause, but barring checks will be skipped for this access attempt.
(NOTE 3):
If the UE selects a new PLMN, then the selected PLMN is used to check the membership; otherwise the UE uses the RPLMNor a PLMN equivalent to the RPLMN.
(NOTE 4):
This includes the 5GMM connection management procedures triggered by the UE-initiated NAS transport procedure for transporting the MO SMS.
(NOTE 5):
The UE configured for NAS signalling low priority is not supported in this release of specification. If a UE supporting both S1 mode and N1 mode is configured for NAS signalling low priority in S1 mode as specified in 3GPP TS 24.368 [17] or 3GPP TS 31.102 [22], the UE shall ignore the configuration for NAS signalling low priority when in N1 mode.
(NOTE 6):
If the access category applicable for the access attempt is 1, then the UE shall additionally determine a second access category from the range 3 to 7. If more than one access category matches, the access category of the lowest rule number shall be chosen. The UE shall use the second access category only to derive an RRC establishment cause for the access attempt.
(NOTE 7):
"EAB override" does not apply, if the UE is not configured to allow overriding EAB (see the "Override_ExtendedAccessBarring" leaf of NAS configuration MO in 3GPP TS 24.368 [17] or 3GPP TS 31.102 [22]), or if NAS has not received an indication from the upper layers to override EAB and the UE does not have a PDU session that was established with EAB override.
(NOTE 8):
For the definition of categories a, b and c associated with access category 1, see 3GPP TS 22.261 [3]. The categories associated with access category 1 are distinct from the categories a, b and c associated with EAB (see 3GPP TS 22.011 [1A]).
(NOTE 9):
This includes:
a) the UE-initiated NAS transport procedure for transporting a mobile originated location request;
b) the 5GMM connection management procedure triggered by a) above; and
c) NAS signalling connection recovery during an ongoing 5GC-MO-LR procedure.
(NOTE 10):
This includes:
a) the UE-initiated NAS transport procedure for transporting a mobile originated signalling transaction towards the PCF;
b) the 5GMM connection management procedure triggered by a) above; and
c) NAS signalling connection recovery during an ongoing UE-requested policy provisioning procedure for V2XP, ProSeP or both (see 3GPP TS 24. 587 [19B] and see 3GPP TS 24.554 [19E]) .

Access control barring information 516 may be broadcasted on service link 110 by eNB function 412 of satellite 104 via service link radio interface 410. In one example implementation, access control barring information 516 may be included in a master information block, MIB, and/or a system information block, SIB. In some case, access control barring information 516 may indicate one or more access categories which are barred at the time of broadcast. In this case, wireless terminal 102 may consider the one or more access categories as barred and consider other access categories accessible (not barred). In another case, access control barring information 516 may specify barring status for each of all the access categories defined in access barring mapping table 514.

When satellite 104 loses feeder link 112, such as satellite 104 at location 220 in FIG. 3 and satellite 104 at the location 322 in FIG. 4, satellite 104 may broadcast access control barring information 516 indicating that the access category for S&F data, access category N in Table 1, is allowed (accessible or not barred) and the other access categories for mobile-originated, MO, access attempts are not allowed (not accessible or barred). In this situation, a mobile-terminated, MT, access attempt, e.g., access category 0 in Table 1. may be allowed to support incoming S&F data as depicted in FIG. 4. When receiving such access control barring information, wireless terminal 102 may consider that satellite 104 is currently in the S&F operation mode, and thus may refrain from initiating MO access attempts except for MO S&F data, and further check if the S&F operation is configured (subscribed). If configured (subscribed), wireless terminal 102 may consider an access attempt for S&F data is eligible.

When feeder link 112 is available for satellite 104, such as satellite 104 in FIG. 2, broadcast access control barring information 516 broadcasted from satellite 104 may indicate all or some of the access categories for MO/MT access attempts are allowed. In this case, the access category for S&F data, e.g., access category N in Table 1, may or may not be allowed. If allowed the access attempt for the S&F data may be honored by eNB function 412 of satellite 104 but the payload of the S&F data from wireless terminal 102 will be sent to core network 108 without being stored in store and forward function 414. If not allowed, wireless terminal may refrain from initiating an access attempt for the S&F data or use another access category.

Listing 1 shows an example implementation of the access control barring information, UAC-Param-NB-r16, which consists either one UAC-Barring-NB-r16 information element, IE, common for all public land mobile networks, PLMNs, or one or more UAC-Barring-NB-r16 IEs per PLMN. In UAC-Barring-NB-r16 IE, barred access categories may be specified in the list UAC-BarringPerCatList-NB-r16. Each of the entries (UAC-BarringPerCat-NB-r16) in UAC-BarringPerCatList-NB-r16 may provide parameters to control barring, such as probability that an access attempt would be allowed during access barring check. If the access attempt is not allowed at all, probability 0 (uac-BarringFactor-r16=p00) may be assigned. In the present embodiment and mode, uac-accessCategory-r16=N in UAC-BarringPerCat-NB-r16 may be used to specify barring of the access category for S&F data.

Listing 1

```
UAC-Param-NB-r16 ::=                    CHOICE {
  uac-BarringCommon                       UAC-Barring-NB-r16,
  uac-BarringPerPLMN-List                 SEQUENCE (SIZE (1..maxPLMN-
r11)) OF UAC-Barring-NB-r16
}
UAC-Barring-NB-r16 ::=                  SEQUENCE {
  uac-BarringPerCatList-r16                               UAC-
BarringPerCatList-NB-r16 OPTIONAL, -- Need OR
  uac-AC1-SelectAssistInfo-r16            UAC-AC1-
SelectAssistInfo-r15 OPTIONAL,   -- Need OR
  uac-BarringForAccessIdentity-r16        BIT STRING (SIZE (7))
}
UAC-BarringPerCatList-NB-r16 ::= SEQUENCE (SIZE
(1..maxAccessCat-1-r15)) OF UAC-BarringPerCat-NB-r16
UAC-BarringPerCat-NB-r16 ::=            SEQUENCE {
  uac-accessCategory-r16                  INTEGER
(1..maxAccessCat-1-r15),
  uac-BarringFactor-r16                   ENUMERATED {p00, p05,
p10, p15, p20, p25, p30, p40,
  p50, p60, p70, p75, p80, p85, p90, p95},
  uac-BarringTime-r16                     ENUMERATED {s4, s8,
s16, s32, s64, s128, s256, s512}
}
```

As the second example implementation, which may be used as an alternative, or in conjunction with the first implementation of this embodiment employing UAC, the satellite may simply broadcast an indication of the S&F operation mode in system information. For example, one binary field may be included in a MIB or a SIB, indicating whether the satellite is in the S&F operation mode, i.e., no feeder link available, or not, i.e., feeder link is available. If the binary field indicates the S&F operation mode, the wireless terminal, if configured, e.g., subscribed, with S&F, may be eligible to initiate an access attempt for S&F data. Otherwise, the wireless terminal may operate in a normal manner. When the binary field is used in conjunction with UAC, the final decision to initiate an access attempt for S&F data may be based on whether the UAC bars the access attempt or not.

In one configuration of the second example implementation, the indication of the S&F operation mode may be broadcasted as a cell barring indication. In this case, if the indication indicates the S&F operation mode, wireless terminals not configured (subscribed) with S&F operation may be barred from camping on the cell served by the satellite, and thus attempt to discover/select another cell. Whereas wireless terminals configured (subscribed) with S&F operation may ignore the cell barring indication.

Figure 8:
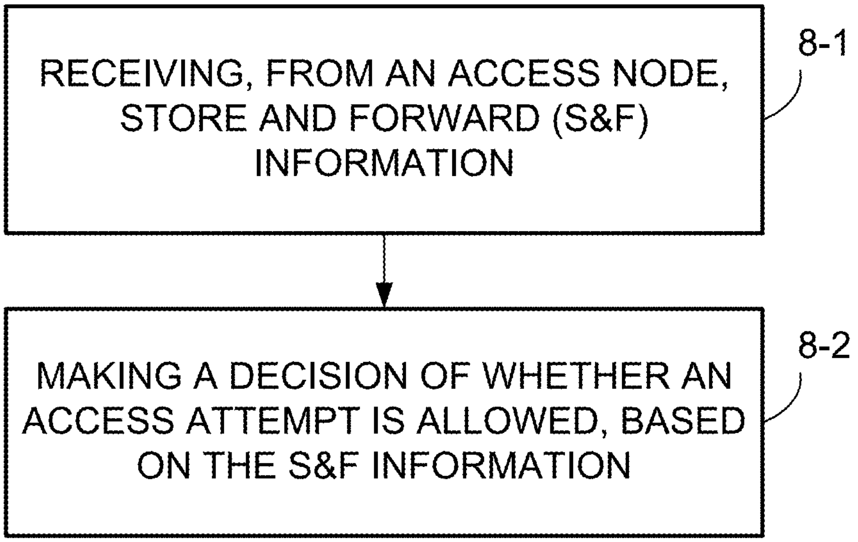
FIG. 8 is a flow chart showing example representative steps or acts performed by a wireless terminal such as the wireless terminal of FIG. 2.

FIG. 8 is a flow chart showing example representative steps or acts performed by a wireless terminal, e.g., wireless terminal 102 of FIG. 2.

Act 8-1 comprises receiving, from an access node, store and forward (S&F) information. The S&F information may comprise (1) S&F operation mode status indicating that the access node provides S&F service, and (2) access control information, the access control information for the S&F service. The S&F service provides storing and forwarding of user data while a feeder link that connects the access node and a core network is unavailable. In one example implementation, the S&F information may be broadcasted in system information. The access control information may comprise an indication indicating whether an access attempt for an access category assigned to the S&F service is allowed.

Act 8-2 comprises making a decision of whether an access attempt is allowed, based on the S&F information. The decision may be further based on one or additional rules. For example, one of the rules may be whether the S&F service is (pre) configured to the wireless terminal. Additionally or alternatively, one of the rules may be whether the S&F operation mode status is indicated in the S&F information. The wireless terminal may transmit user data to the access node in a case that the access attempt is allowed. In this case, the user data may be stored in the access node while the feeder link is unavailable and may be forwarded to the core network upon or after the feeder link becomes available.

Figure 9:
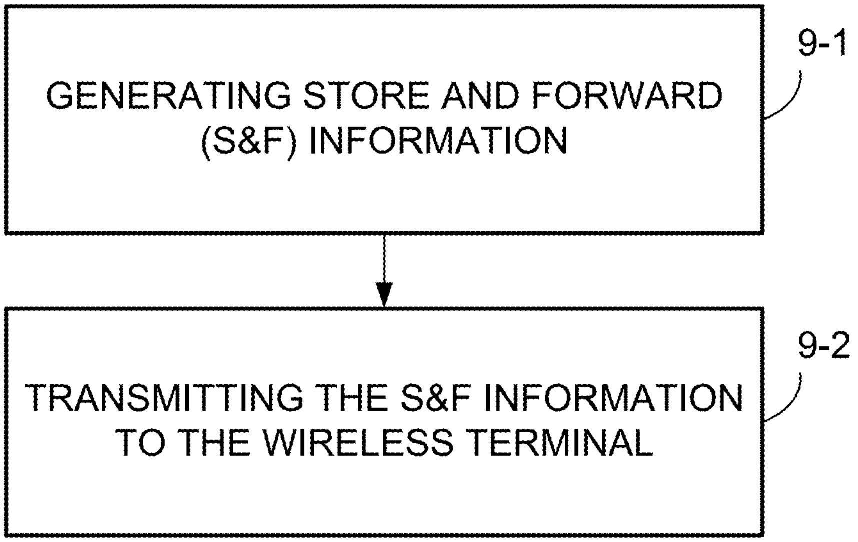
FIG. 9 is a flow chart showing example representative steps or acts performed by a satellite such as the satellite of FIG. 2.

FIG. 9 is a flow chart showing example representative steps or acts performed by an access node, e.g., satellite 104 of FIG. 2.

Act 9-1 comprises generating store and forward (S&F) information. The S&F information may be generated by store and forward function 414. The S&F information may comprise (1) S&F operation mode status indicating that the access node provides S&F service, and (2) access control information, the access control information for the S&F service. The S&F service provides storing and forwarding of user data while a feeder link that connects the access node and a core network is unavailable. In one example implementation, the S&F information may be broadcasted in system information. The access control information may comprise an indication indicating whether an access attempt for an access category assigned to the S&F service is allowed.

Act 9-2 comprises transmitting the S&F information to the wireless terminal. The S&F information may be used by the wireless terminal to make a decision of whether an access attempt is allowed. In a case that the access attempt is allowed, the wireless terminal may transmit user data to the access node in a case that the access attempt is allowed, the access node may receive user data from the wireless terminal, which may be stored in a data storage while the feeder link is unavailable and is forwarded to the core network upon or after the feeder link becomes available.

Embodiment 2: Inactive State Transition for Store and Forward Operation

In the aforementioned S&F operation, it may be required that user data from or to a wireless terminal be protected by security features, such as encryption and integrity protection. Typical security architectures for cellular communication systems are specified, by way of example, in 3GPP TS 33.401, "3GPP System Architecture Evolution (SAE); Security architecture", Jun. 22, 2023, and TS33.501, "Security architecture and procedures for 5G System". Jan. 4, 2024, both of which are incorporated herein by reference. In such typical security architectures, a wireless terminal may first establish a non-access stratum (NAS) security context with an entity of a core network, e.g., with a Mobility Management Entity, MME, or Access and Mobility Management Function, AMF. The non-access stratum (NAS) security context may be established with NAS security keys shared by the wireless terminal and the entity of the core network. Such NAS security keys may be used to derive access stratum, AS, security keys and establish an AS security context between the wireless terminal and a serving base station, e.g., eNB or gNB.

As shown in FIG. 3 or FIG. 4, the core network is invisible from the wireless terminal or the satellite during the S&F operation. This means that during the S&F operation the wireless terminal may not be able to establish a new NAS security context and therefore may not be able to establish a new AS security context either. Thus, the satellite telecommunication system of this embodiment and mode may utilize an inactive state, such as RRC_INACTIVE state per 3GPP TS 36.331 or TS38.331, during the S&F operation. That is, the wireless terminal may first establish the NAS security context with the core network when the connection to the core network is available, and then based on the NAS security context may establish the AS security context with a currently serving eNB, and maintain the NAS/AS security contexts until a next S&F data transmission/reception.

Figure 10:
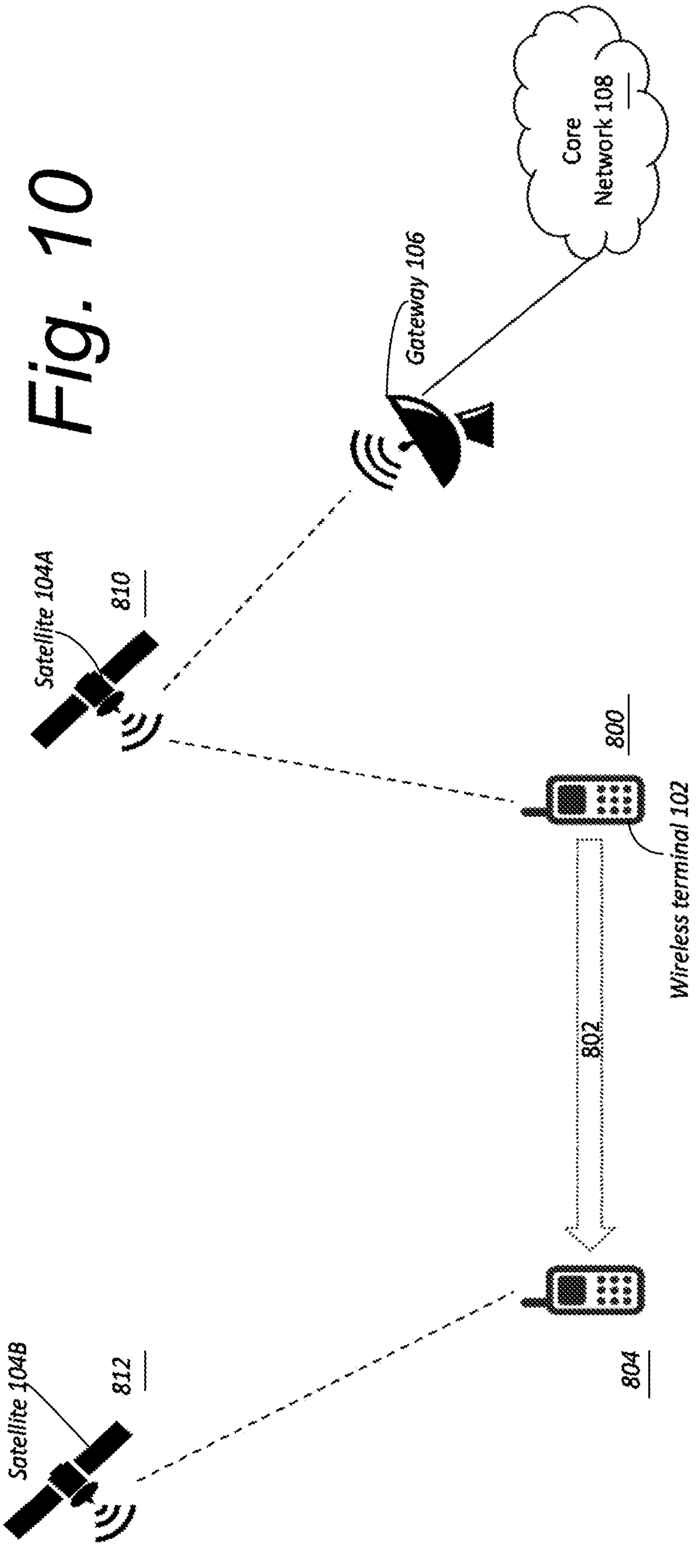
FIG. 10 is a diagrammatic view of a satellite telecommunication system wherein a wireless terminal may first establish a NAS security context with a core network when the connection to the core network is available, and then based on the NAS security context may establish the AS security context with a currently serving eNB.

FIG. 10 shows an example scenario for this embodiment. Wireless terminal 102 at location 800 may first communicate with the entity, e.g., MME or AMF, of core network 108 via satellite 104A and gateway 106. Herein wireless terminal 102 may establish the NAS security context with core network 108 and the AS security context with eNB function 412 of satellite 104A. Wireless terminal 102 may then move from location 800 under the coverage of satellite 104A as shown in arrow 802, and go to location 804, which is covered by the coverage of satellite 104B not having a feeder link. Satellite 104B may be a satellite different from satellite 104A, or the same as satellite 104A, e.g., satellite 104B may be satellite 104A which has moved from location 810 to location 812. Wireless terminal 102 in an inactive state at location 804 may initiate S&F data transmission/reception with satellite 104B, using the NAS and AS security contexts previously established.

Figure 11:
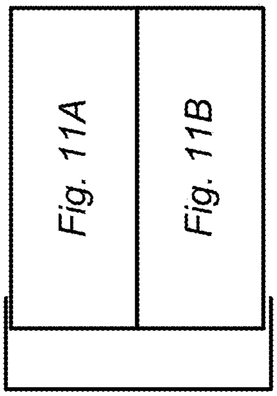
FIG. 11 is a diagrammatic view showing a relationship between FIG. 11A and FIG. 11B.
Figure 11A:
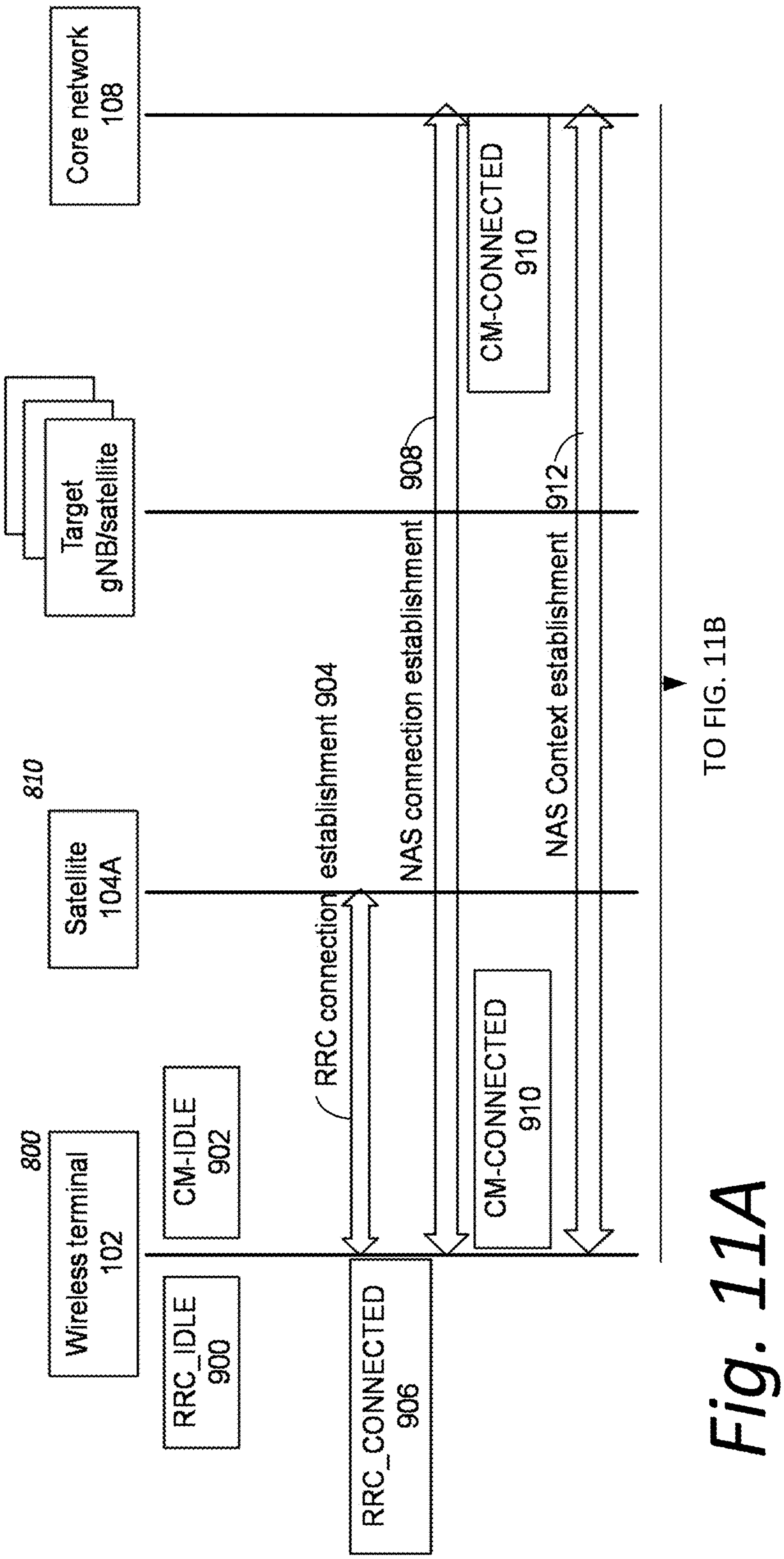
FIG. 11A and FIG. 11B are diagrammatic views showing a first example scenario of signaling in aa satellite telecommunication system of the example embodiment and mode of FIG. 10.
Figure 11B:
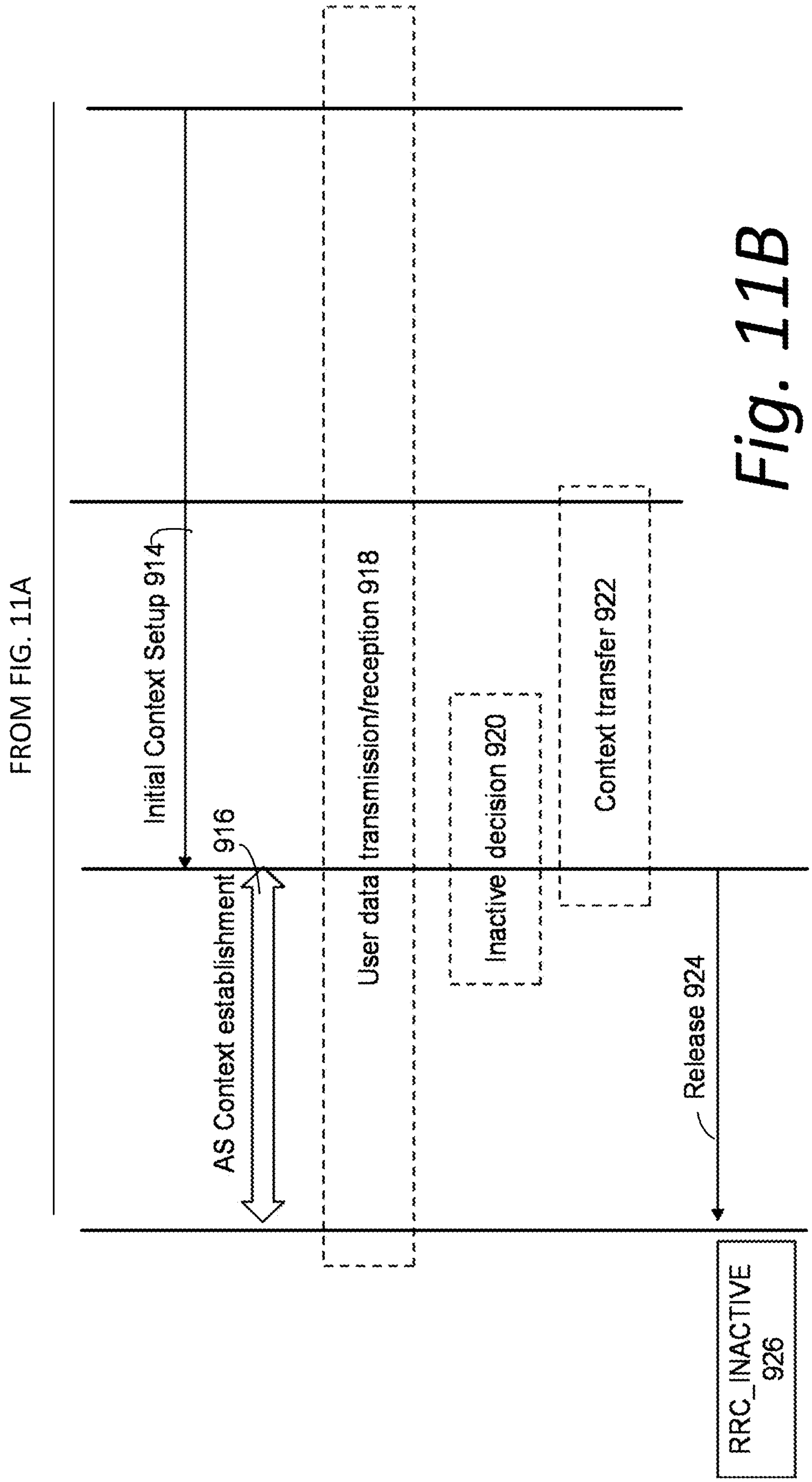

FIG. 11A and FIG. 11B illustrate an example message flow of the scenario for wireless terminal 102 at location 800 shown in FIG. 10. First, wireless terminal 102 may be in RRC_IDLE (state) as shown by act 900, or also in CM-IDLE (state) as shown by act 902. In the RRC_IDLE state of act 900, wireless terminal 102 has no signaling connection established with an eNB, but in the CM-IDLE state of act 902, wireless terminal has no signaling connection to core network 108.

As act 904, wireless terminal 102 may initiate an RRC connection establishment with satellite 104A at location 810. The RRC connection may be handled by eNB function 412 of satellite 104A. The RRC connection establishment may include a random access procedure and transmission/reception of RRC messages for connection setup. Successful RRC connection establishment may lead wireless terminal 102 to enter the RRC_CONNECTED state, as depicted by act 906.

As act 908, wireless terminal 102 may attempt to perform NAS connection establishment, by sending an initial NAS message, e.g., a Service Request, to core network 108, followed by reception of a response message, e.g., Service Accept. After successful completion of the NAS connection establishment, both wireless terminal 102 and core network 108 may enter the CM-CONNECTED state as shown by act 910.

Wireless terminal 102 may then proceed to establishing NAS security context as shown in act 912. Act 912 comprises wireless terminal 102 and core network 108, e.g., an MME/AMF of core network 108, establishing a NAS security context, by performing mutual authentication and exchanging NAS security keys/algorithms.

Core network 108 may then send an initial context setup message to satellite 104A, specifically eNB function 412 of satellite 104A, as shown by act 914. The initial context setup message may include at least AS security keys derived from the NAS security keys. In addition, the initial context setup message may further include core network assistance information for RRC_INACTIVE, which may be used by eNB function 412 of satellite 104A to instruct wireless terminal 102 to enter RRC_INACTIVE state later on, e.g., act 924. The core network assistance information may comprise expected/predicted activities, mobility, trajectories of wireless terminal 102. For a wireless terminal that subscribes the S&F data, such as wireless terminal 102, the core network assistance information may further comprise S&F subscription status, identification of candidate satellites/cells which will be possibly used by wireless terminal 102 later time for S&F operation. Core network 108 may generate the core network assistance information based on historical location data and/or subscription information of wireless terminal 102.

As act 916, wireless terminal 102 and satellite 104A, and specifically eNB function 412 of satellite 104A, may establish an AS security context. The AS security context may be established by eNode B (eNB) function 412 performing mutual authentication and exchanging AS security keys/algorithms, based on the NAS security keys exchanged with core network 108 during act 912.

As act 918, wireless terminal 102 may transmit/receive user data with core network 108. The NAS/AS security keys may be used for encryption/integrity protection of the user data.

As act 920, satellite 104A, e.g., the eNode B (eNB) function 412 of satellite 104A, may decide to instruct wireless terminal 102 to enter RRC_INACTIVE state. The decision may be based on inactivity of user data.

As act 922, satellite 104A, e.g., the eNB function 412 of satellite 104A, may, based on the core network assistance information, transfer UE context to candidate target eNBs/satellites. The transferred UE context may include a context identity to identify the UE context for wireless terminal 102 and an updated AS security context to be used by the candidate target eNBs/satellites. The updated AS security context may be derived from the current AS security context established during act 916. Satellite 104A may communicate with the candidate target eNBs/satellites, not illustrated in FIG. 10, via gateway 106 or through core network 108.

In a legacy system, a context transfer may not happen at the timing depicted by act 922. Instead, typically it takes place at a target eNB where a wireless terminal attempts to resume an RRC connection, and the target eNB may attempt to retrieve the UE context from a source eNB, e.g., satellite 104A. However, since a feeder link is not available for a satellite under S&F operation, UE context transfer for the wireless terminal in such a manner may not be possible. Therefore, eNB function 412 of satellite 104A of this embodiment may determine, based on the core network assistance information, candidate target satellites, such as satellite 104B of FIG. 10, that will be likely to serve wireless terminal 102 under S&F operation and may transfer the UE context of wireless terminal 102 to the candidate target satellites beforehand. Note that this context transfer of act 922 to a candidate target satellite may happen before act 924 if the candidate target satellite is reachable with its feeder link available, otherwise, it may happen after act 924.

In act 924, satellite 104A, e.g., eNB function 412 of satellite 104A, may send a release message to wireless terminal 102, with an instruction to enter RRC_INACTIVE state, the context identity and AS security parameters to be used to derive the updated AS security context. Based on the release message, wireless terminal may enter RRC_INACTIVE state, shown as act 926, and store the UE context with the context identity. At this point, the NAS connection state for wireless terminal 102 and core network 108 remains in the CM-CONNECTED state.

Figure 12:
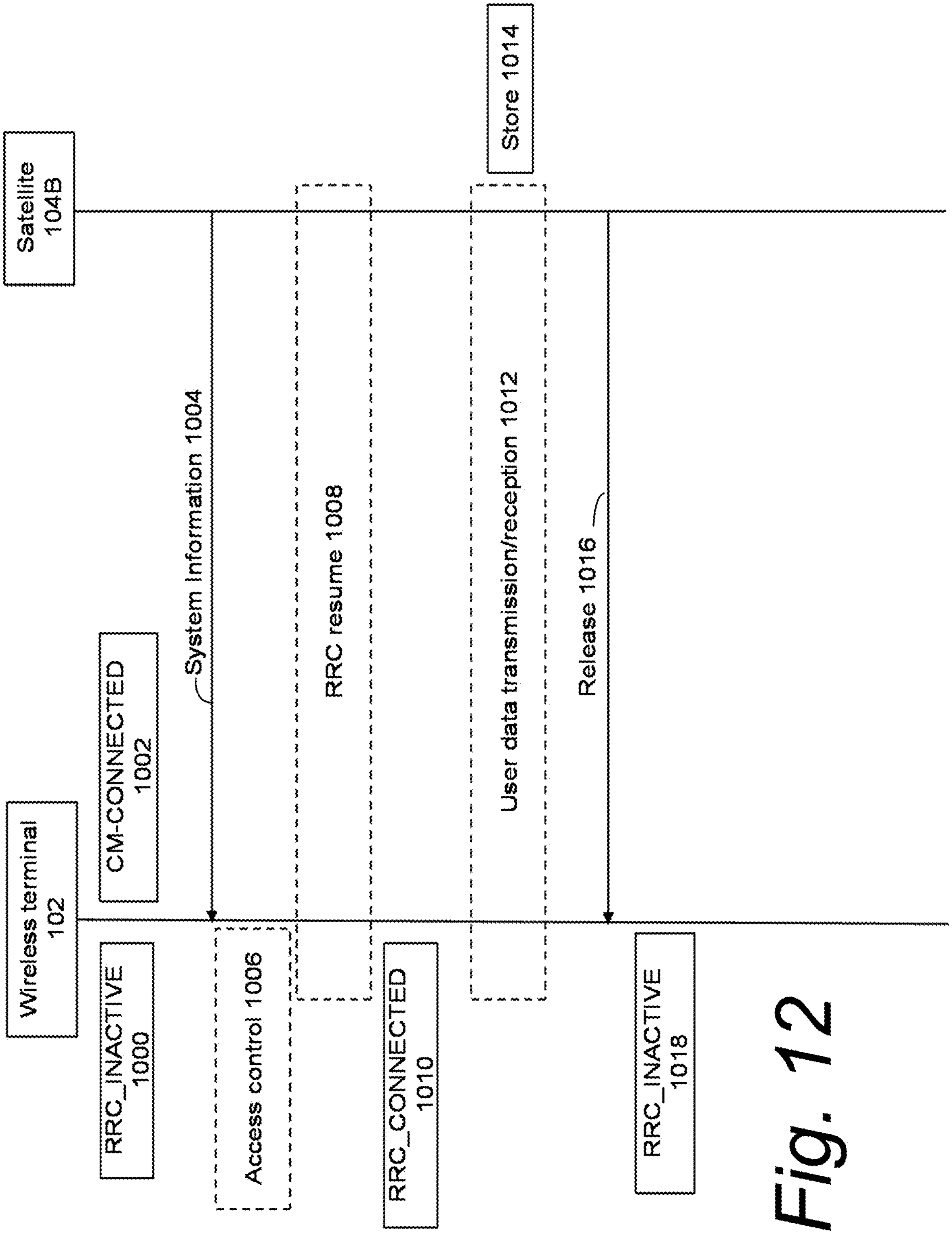
FIG. 12 is a diagrammatic view showing a second example scenario of signaling in aa satellite telecommunication system of the example embodiment and mode of FIG. 10.

FIG. 12 shows an example message flow for the scenario depicted in FIG. 10, where wireless terminal 102 is at location 804 and has discovered a cell served by satellite 104B, which does not have a feeder link. As shown by act 1000 and act 1002 of FIG. 12, wireless terminal 102 may maintain RRC_INACTIVE state and CM-CONNECTED.

As shown by act 1004, wireless terminal 102 may receive, from satellite 104B, system information, which may indicate that the satellite 104B is under S&F operation. Wireless terminal 102 may perform act 1006, i.e., the access control procedure as disclosed in Embodiment 1. If an access attempt for S&F data is considered to be allowed, wireless terminal may proceed to the next act. Otherwise, it may stop the access attempt and may look for other cells.

As act 1008, wireless terminal 102 may perform a connection resume procedure, which may comprise wireless terminal 102 sending a resume request message including the context identity. The resume request may further include integrity protection information derived from the updated AS security context described in act 924 and act 926 of FIG. 11. If satellite 104B, e.g., eNode B (eNB) function 412 of satellite 104B, stores the UE context of wireless terminal 102, satellite 104B may respond with a positive acknowledgement and proceed to the next step. Otherwise, satellite 104B, e.g., eNode B (eNB) function 412 of satellite 104B, may reject the resume request message by responding with a negative acknowledgement (not illustrated).

Wireless terminal 102, after a successful connection resume procedure, enters RRC_CONNECTED, as shown by act 1010.

Wireless terminal 102 may then transmit/receive S&F data with satellite 104B. The S&F data may be encrypted/integrity protected by the NAS security context and/or the updated AS security context. Satellite 104B may store the S&F data using store and forward function 414, as shown in act 1014.

In act 1016, satellite 104B, for example eNode B (eNB) function 412 of satellite 104B, may send a release message. The release message may be triggered in many different ways. For example, the release message may be triggered after a certain duration of inactivity, based on the subscription that limits maximum amount of data, or the prediction of satellite 104B that wireless terminal 102 may be soon out of the coverage. The eNB function 412 of satellite 104B may decide to instruct wireless terminal 102 to enter RRC_INACTIVE again, or to enter RRC_IDLE. In the case of RRC_INACTIVE, the release message of act 1016 is similar to the release message of act 924, and context transfer for the UE context of wireless terminal 102 will be performed later when the feeder link for satellite 104B becomes available. In the case of RRC_IDLE, wireless terminal 102 and satellite 104B may discard the stored UE context.

In the scenario illustrated in FIG. 10, FIG. 11A and FIG. 11B, and FIG. 12, wireless terminal 102 may enter RRC_INACTIVE at location 800 based on the instruction from satellite 104A, move to location 804 and select/reselect the cell served by satellite 104B. As disclosed in Embodiment 1, satellite 104B may indicate via system information that it is in the S&F operation mode. When an access attempt occurs in wireless terminal 102 at location 804, a successful connection resume and S&F data transmission/reception may be dependent on whether satellite 104B possesses the UE context of wireless terminal 102. If wireless terminal 102 pursues the access attempt without knowing if its UE context has been successfully transferred to satellite 104B, such an access attempt may result in being rejected.

Thus, in the present embodiment and mode, a wireless terminal configured with the S&F operation may be provided with information regarding status of UE context transfer, e.g., context transfer status. The context transfer status may be provided to the wireless terminal on or before the wireless terminal enters an inactive state and may be stored in the wireless terminal. As a baseline, the context transfer status may include an indication indicating that the UE context of the wireless terminal is supposed to be transferred. In addition to or an alternative to the baseline, the context transfer status may include an identity(ies) of a candidate target satellite(s), and/or an identity(ies) of a cell(s) served by the candidate target satellite(s), where the UE context of the wireless terminal is to be transferred.

The wireless terminal, when camping on a cell served by a satellite that advertising the S&F operation mode (no feeder link), may make a decision on whether to proceed to an access attempt for S&F data based on the stored context transfer status, even if the access control of Embodiment 1 allows the access attempt. Specifically, if the stored context transfer status indicates that the UE context of the wireless terminal is supposed to be transferred to the cell served by the satellite, the wireless terminal may pursue on the access attempt. Otherwise, the wireless terminal may stop the access attempt since it is highly likely to be rejected by the satellite.

The eNB that instructs the wireless terminal to enter RRC_INACTIVE, such as eNB function 412 of satellite 104A, may generate the context transfer status for the wireless terminal, based on the core network assistance information and the outcome of the context transfer in act 922 if it has already taken place. As disclosed above, the context transfer status may include an indication indicating that the UE context of the wireless terminal is to be transferred. Additionally or alternatively, the context transfer status may include an identity(ies) of a candidate target satellite(s), and/or an identity(ies) of a cell(s) served by the candidate target satellite(s), where the UE context of the wireless terminal is to be transferred.

The context transfer status may be included in a release message, such as release message of act 924 or release message of act 1016, along with the instruction to enter RRC_INACTIVE state. Listing 2 shows an example format of the release message, wherein the presence of the RRC-InactiveConfig-r15 optional information element may be the instruction to enter RRC_INACTIVE state. In the RRC-InactiveConfig-r15 optional information element, the presence of the ContextTransferStatus optional information element may indicate that the UE context will be/has been transferred. In addition, targetCellList, if present, provides a list of identities of cells where the UE context will be/has been transferred. Moreover, targetSatelliteList may provide a list of identities of satellites where the UE context will be/has been transferred, in addition to or as an alternative to targetCellList.

Listing 2

```
RRCConnectionRelease ::=                                SEQUENCE {
   rrc-TransactionIdentifier                                    RRC-
TransactionIdentifier,
   criticalExtensions                                           CHOICE {
      c1                                                           CHOICE {
         rrcConnectionRelease-r8
   RRCConnectionRelease-r8-IEs,
         spare3 NULL, spare2 NULL, spare1 NULL
      },
      criticalExtensionsFuture                                  SEQUENCE { }
   }
}
RRCConnectionRelease-r8-IEs ::=                             SEQUENCE {
   releaseCause                                                 ReleaseCause,
   redirectedCarrierInfo
   RedirectedCarrierInfo                                        OPTIONAL, -- Need
ON
   idleModeMobilityControlInfo
   IdleModeMobilityControlInfo                                  OPTIONAL, -- Need
OP
   nonCriticalExtension
   RRCConnectionRelease-v890-IEs                             OPTIONAL
}
RRCConnectionRelease-v890-IEs ::=                       SEQUENCE {
   lateNonCriticalExtension                                  OCTET STRING
(CONTAINING RRCConnectionRelease-v9e0-IEs)                      OPTIONAL,
   nonCriticalExtension
   RRCConnectionRelease-v920-IEs                             OPTIONAL
}
-- Late non critical extensions
RRCConnectionRelease-v9e0-IEs ::= SEQUENCE {
   redirectedCarrierInfo-v9e0
   RedirectedCarrierInfo-v9e0                                   OPTIONAL, -- Cond
NoRedirect-r8
   idleModeMobilityControlInfo-v9e0
   IdleModeMobilityControlInfo-v9e0                          OPTIONAL, -- Cond
IdleInfoEUTRA
   nonCriticalExtension                                         SEQUENCE { }
                                                        OPTIONAL
}
-- Regular non critical extensions
RRCConnectionRelease-v920-IEs ::= SEQUENCE {
   cellInfoList-r9                                              CHOICE {
      geran-r9                                                  CellInfoListGERAN-
r9,
      utra-FDD-r9
   CellInfoListUTRA-FDD-r9,
      utra-TDD-r9
   CellInfoListUTRA-TDD-r9,
      ...,
      utra-TDD-r10                                              CellInfoListUTRA-
TDD-r10
   }
                                                    OPTIONAL, -- Cond Redirection
   nonCriticalExtension                                      RRCConnectionRelease-
v1020-IES                                           OPTIONAL
}
```

-continued

Listing 2

```
RRCConnectionRelease-v1020-IEs ::= SEQUENCE {
  extendedWaitTime-r10                              INTEGER (1..1800)
    OPTIONAL, -- Need ON
  nonCriticalExtension                              RRCConnectionRelease-
v1320-IEs        OPTIONAL
}
RRCConnectionRelease-v1320-IEs ::= SEQUENCE {
  resumeIdentity-r13                                ResumeIdentity-r13
                                        OPTIONAL, -- Need OR
  nonCriticalExtension
  RRCConnectionRelease-v1530-IEs                    OPTIONAL
}
RRCConnectionRelease-v1530-IEs ::= SEQUENCE {
  drb-ContinueROHC-r15                              ENUMERATED {true}
                                        OPTIONAL, -- Cond UP-EDTorPUR
  nextHopChainingCount-r15                          NextHopChainingCount
    OPTIONAL, -- Cond EarlySec
  measIdleConfig-r15
  MeasIdleConfigDedicated-r15                       OPTIONAL, -- Need ON
  rrc-InactiveConfig-r15                            RRC-InactiveConfig-r15
    OPTIONAL, -- Need OR
  cn-Type-r15                                       ENUMERATED
{epc, fivegc}                           OPTIONAL, -- Need OR
  nonCriticalExtension
  RRCConnectionRelease-v1540-IEs                    OPTIONAL
}
...
RRC-InactiveConfig-r15::=                           SEQUENCE {
  fullI-RNTI-r15                                      I-RNTI-r15,
  shortI-RNTI-r15                                     ShortI-RNTI-r15,
  ran-PagingCycle-r15                                 ENUMERATED {   rf32,
rf64, rf128, rf256} OPTIONAL, -- Need OR
  ran-NotificationAreaInfo-r15          RAN-NotificationAreaInfo-r15
    OPTIONAL, -- Need ON
  periodic-RNAU-timer-r15               ENUMERATED { min5,
min10, min20, min30, min60,
                                                      min120,
min360, min720}                           OPTIONAL, -- Need OR
  nextHopChainingCount-r15                          NextHopChainingCount
  OPTIONAL, --Cond INACTIVE
 contextTransferStatus                              ContextTransferStatus
OPTIONAL, -- Need R
  dummy                                               SEQUENCE{ }
  OPTIONAL
}
ContextTransferStatus ::=                           SEQUENCE {
 targetCellList                          SEQUENCE (SIZE (0..32)) OF
CellIdentity OPTIONAL,                   -- Need R
 targetSatelliteList.                    SEQUENCE (SIZE (0..32)) OF
SatelliteIdentity OPTIONAL,                 -- Need R
}
```

Figure 13:
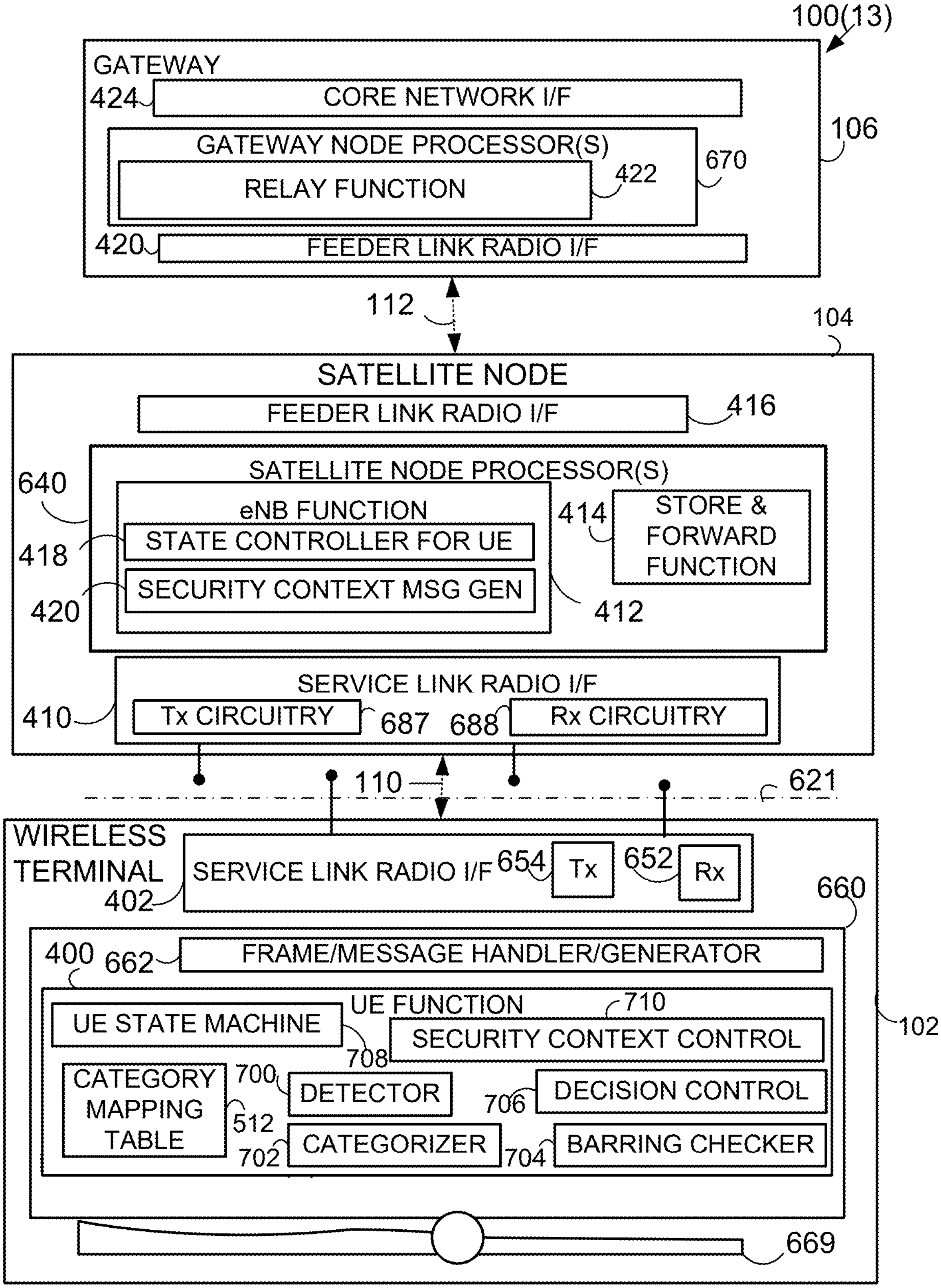
FIG. 13 is a schematic view showing in more detail an example satellite telecommunication system suitable for implementation of a second example embodiment and mode.

FIG. 13 shows in more detail an example satellite telecommunication system 100(13) suitable for implementation of the second example embodiment and mode, e.g., the example embodiment and mode of FIG. 10-FIG. 15. As is the case for the example embodiment and mode of FIG. 7, satellite telecommunication system 100(13) includes wireless terminal 102, which may be user equipment, UE, or an Internet of Things, IoT, and gateway 106. The satellite shown in FIG. 13 is the satellite 104B discussed above with reference to FIG. 10-FIG. 12.

The structure of the wireless terminal 102 of FIG. 13 may include common elements and units such as those of the wireless terminal 102 of FIG. 7, and additional elements or units as well. For example, the wireless terminal 102 of FIG. 13 includes service link radio interface 402, wireless terminal processor(s) 660 which may perform the functions of UE function 400. In addition to the optional inclusion of access detector 700, access categorizer 702, access barring checker 704, and access decision controller 706, the UE function 400 of the wireless terminal 102 of FIG. 13 may also include UE state machine 708 and UE context controller 710. The UE state machine 708 serves to transition the wireless terminal 102 through the various RRC states herein mentioned, including the RRC_IDLE, CM-IDLE, CM-CONNECTED, and RRC_INACTIVE states. It should also be appreciated that UE state machine 708 is provided in the UE function 400 of the wireless terminal 102 of FIG. 7 as well. The UE context controller 710 serves to receive, store, and initiate transmission of security context information between wireless terminal 102 and satellite 104A as well as a target node, e.g., satellite 104B. The security context information may be used by access decision controller 706 to determine whether access to satellite 104B will be successful.

Similarly, the structure of the satellite 104B of FIG. 13 may include common elements and units such as those of the satellite 104 of FIG. 7, and additional elements or units as well. For example, the satellite 104B may comprise service link radio interface 410, eNode B (eNB) function 412, and feeder link radio interface 416. The satellite processor(s) 640 of satellite 104B may encompass and perform the acts of eNode B (eNB) function 412 and store and forward function 414. FIG. 13 further shows that the eNode B (eNB) function 412 may include UE state controller 418, which may be employed, e.g., to change and/or keep track of the RRC state of wireless terminal 102, as well as security context message generator 420. The security context message generator 420 may be used, for example, to generate the release message of act 924 or release message of act 1016, which may include the context transfer status for the wireless terminal, along with the instruction to enter RRC_INACTIVE state.

Figure 14:
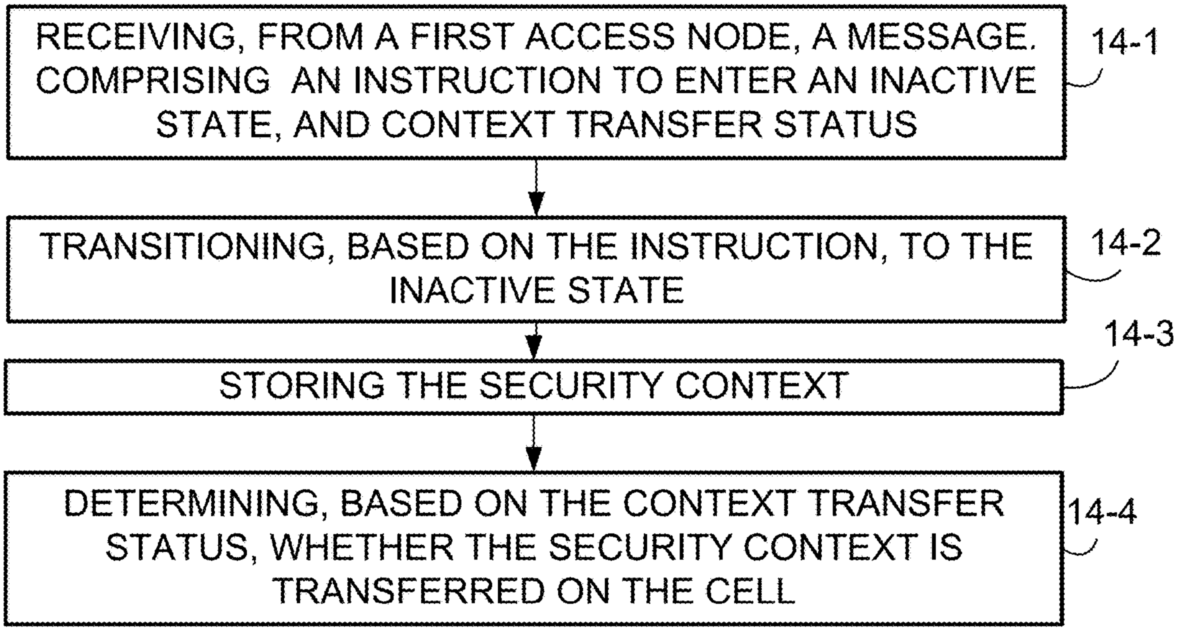
FIG. 14 is a flow chart showing example representative steps or acts performed by a wireless terminal of the example embodiment and mode of FIG. 10.

FIG. 14 is a flow chart showing example representative steps or acts performed by a wireless terminal, e.g., by wireless terminal 102 of FIG. 10.

Act 14-1 comprises receiving, from a first access node, a message. The message may comprise an instruction to enter an inactive state, and context transfer status indicating that a security context of the wireless terminal is transferred to at least one target access nodes. The context transfer status may include identities of the at least one target access node. The at least one target access node may be on a satellite connected wirelessly to a core network via a feeder link, and provide a store and forward (S&F) service by storing and forwarding user data while the feeder link is unavailable. The security context may comprise security keys. The message is a release message, e.g., RRCConnectionRelease message, used to release a connection to the first access node.

Act 14-2 comprises transitioning, based on the instruction, to the inactive state, e.g., RRC_INACTIVE.

Act 14-3 comprises storing the security context.

Act 14-4 comprises, upon camping on a cell served by a second access node, determining, based on the context transfer status, whether the security context is transferred on the cell. In a case that the stored security context is transferred to the cell, the wireless terminal may initiate an access attempt on the cell. Whereas, in a case that the stored security context is not transferred to the cell, the wireless terminal may refrain from initiating an access attempt on the cell.

Figure 15:
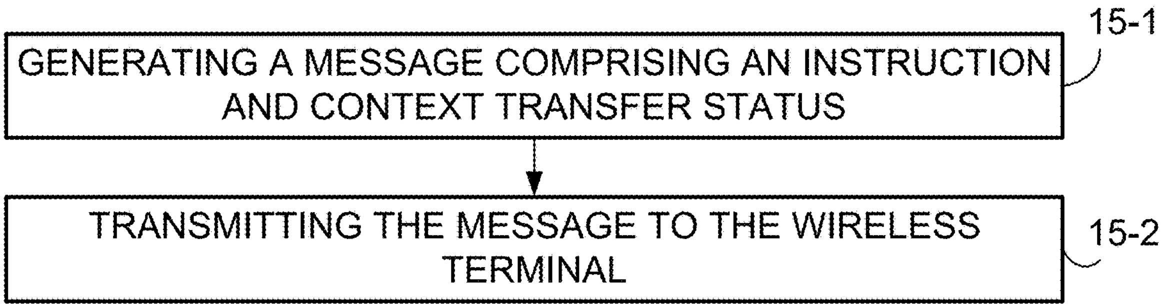
FIG. 15 is a flow chart showing example representative steps or acts performed by a satellite of the example embodiment and mode of FIG. 10.

FIG. 15 is a flow chart showing example representative steps or acts performed by an access node e.g., satellite 104A of FIG. 10.

Act 15-1 comprises generating a message. The message may comprise an instruction to enter an inactive state, and context transfer status indicating that a security context of the wireless terminal is transferred to at least one target access node. The context transfer status may be used by the wireless terminal to determine, upon camping on a cell, whether the security context is transferred to the cell. The context transfer status may further indicate an identity of the at least one target access node. The at least one access node may be on a satellite connected wirelessly to a core network via a feeder link, and provide a store and forward (S&F) service by storing and forwarding user data while the feeder link is unavailable. The security context may comprise security keys. The message may be a release message (e.g., RRCConnectionRelease message), which may be used to release a connection to the wireless terminal.

Act 15-2 comprises transmitting the message generated at act 15-1 to wireless terminal 102.

Further Considerations

The technology disclosed herein thus encompasses various example embodiment and modes of store and forward (S&F) operations for a non-terrestrial network (NTN), including but not limited to the following:

The wireless terminal is provided with S&F information to be used to initiate an access attempt for S&F service;

The wireless terminal is instructed to enter an inactive state with security context transfer status that indicates the current security context can be used on a satellite under S&F operation.

As such, the technology disclosed herein concerns the structure and operation of networks, including network nodes, and wireless terminals that are involved in operations such as, for example, determination of how and when S&F service is accessible, how to access the S&F service, and secure operation of the S&F service. It will thus be appreciated that the technology disclosed herein is directed to solving radio communications-centric issues and is necessarily rooted in computer technology and overcomes problems specifically arising in radio communications. Moreover, the technology disclosed herein improves operation of wireless terminals and nodes which may utilize the S&F service.

Figure 16:
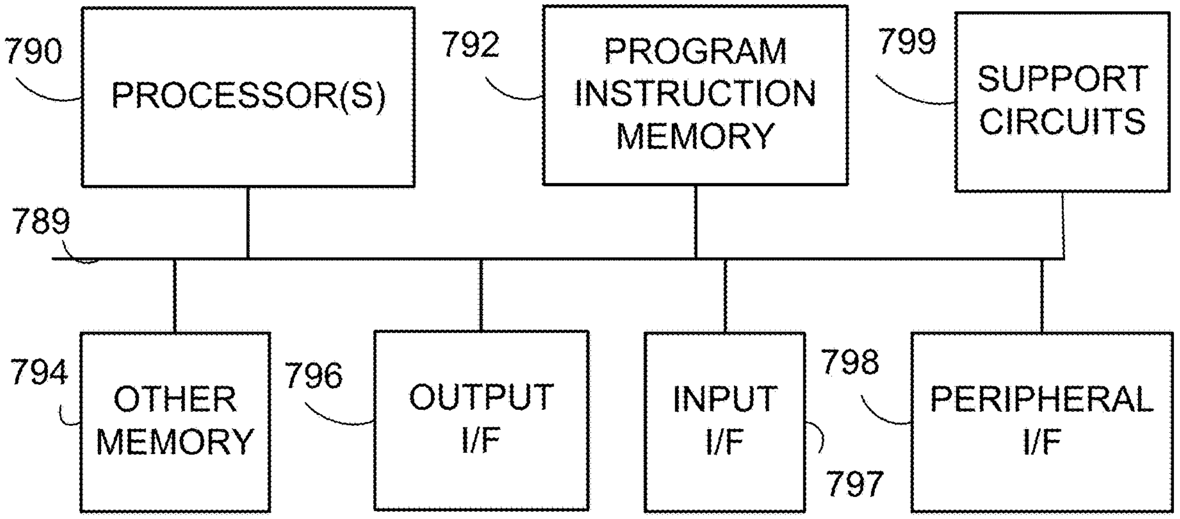
FIG. 16 is a diagrammatic view showing example elements comprising electronic machinery which may comprise a wireless terminal, a radio access node, and a core network node according to an example embodiment and mode, and thus how the technology disclosed herein may be implemented, at least in part, by a non-transitory computer readable medium encoded with a computer program that, when executed by a computer or processor of one or more of the terminals and/or nodes described herein, causes the computer to implement the acts described herein.

Certain units and functionalities of the systems 100 may be implemented by electronic machinery. For example, electronic machinery may refer to the processor circuitry described herein, such as terminal processor circuitry 660, satellite processor(s) 670, and gateway processor(s) 680. Moreover, the term "processor circuitry" is not limited to mean one processor, but may include plural processors, with the plural processors operating at one or more sites. Moreover, as used herein the term "server" is not confined to one server unit but may encompass plural servers and/or other electronic equipment and may be co-located at one site or distributed to different sites. With these understandings, FIG. 16 shows an example of electronic machinery, e.g., processor circuitry, as comprising one or more processors 790, program instruction memory 792; other memory 794 (e.g., RAM, cache, etc.); input/output interfaces 796 and 797, peripheral interfaces 798; support circuits 799; and busses 789 for communication between the aforementioned units. The processor(s) 790 may comprise the processor circuitries described herein, for example, wireless terminal processor(s) 660, satellite processor(s) 670, gateway processor(s) 680, or any processor(s) of a network entity of the core network.

A memory or register described herein may be depicted by memory 794, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 799 are coupled to the processors 790 for supporting the processor in a conventional manner. These circuits include cache, power supplies, clock circuits, input/output circuitry and subsystems, and the like.

The term "configured" may relate to the capacity of a device whether the device is in an operational or non-operational state. Configured may also refer to specific settings in a device that affect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as “computer”, “processor” or “controller”, may be provided using hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term “processor” or “controller” may also be construed to refer to other hardware capable of performing such functions and/or executing software, such as the example hardware recited above.

Nodes that communicate using the air interface also have suitable radio communications circuitry. Moreover, the technology disclosed herein may additionally be embodied entirely within any form of computer-readable memory, such as solid-state memory, magnetic disk, or optical disk containing an appropriate set of computer instructions that would cause a processor to carry out the techniques described herein.

The technology of the example embodiments and modes described herein encompasses a non-transitory computer readable medium encoded with a computer program that, when executed by a computer or processor of the wireless terminal described herein, causes the computer to implement the acts described herein, and/or a non-transitory computer readable medium encoded with a computer program that, when executed by a computer or processor of the mobile base station relay described herein, causes the computer to implement the acts described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The technology disclosed herein encompasses but is not limited to the following example embodiments:

Example Embodiment 1: Example Embodiment 1: A wireless terminal that communicates with an access node on a satellite via a service link, the wireless terminal comprising:

receiver circuitry configured to receive, from the access node, store and forward (S&F) information comprising:

S&F operation mode status indicating that the access node provides S&F service, and;

access control information, the access control information for the S&F service;

processor circuitry configured, based on the S&F information, to make a decision whether an access attempt is allowed;

wherein the S&F service comprises storing and forwarding of user data.

Example Embodiment 2: The wireless terminal of Example Embodiment 1, wherein the S&F information is received in broadcasted system information.

Example Embodiment 3: The wireless terminal of Example Embodiment 1, wherein the access control information comprises an indication indicating whether an access attempt for an access category assigned to the S&F service is allowed.

Example Embodiment 4: The wireless node of Example Embodiment 1, wherein the decision is further based on whether the S&F service is configured to the wireless terminal.

Example Embodiment 5: The wireless node of Example Embodiment 1, wherein the decision is further based on whether the S&F operation mode status is indicated in the S&F information.

Example Embodiment 6: The wireless terminal of Example Embodiment 1, wherein the wireless terminal further comprises transmitter circuitry that is configured to transmit user data to the access node in a case that the access attempt is allowed.

Example Embodiment 7: The wireless terminal of Example Embodiment 1, wherein the user data is stored in the access node while a feeder link, which connects the access node to a core network, is unavailable and is forwarded to the core network upon or after the feeder link becomes available.

Example Embodiment 8: An access node on a satellite, the access node communicating with a wireless terminal via a service link and with a core network wirelessly via a feeder link, the access node comprising:

processor circuitry configured to generate store and forward (S&F) information comprising:

S&F operation mode status indicating that the access node provides S&F service, and;

access control information, the access control information for the S&F service;

transmitter circuitry configured to transmit the S&F information to the wireless terminal, wherein;

the S&F service comprises storing and forwarding of user data while the feeder link is unavailable for the access node, and;

the S&F information is configured for use by the wireless terminal to make a decision whether an access attempt is allowed for the wireless terminal.

Example Embodiment 9: The access node of Example Embodiment 8, wherein the S&F information is broadcasted in system information.

Example Embodiment 10: The access node of Example Embodiment 8, wherein the access control information comprises an indication whether an access attempt for an access category assigned to the S&F service is allowed.

Example Embodiment 11: The access node of Example Embodiment 8, wherein the access node further comprises receiver circuitry that is configured to receive user data from the wireless terminal in a case that the access attempt is allowed.

Example Embodiment 12: The access node of Example Embodiment 8, wherein the access node further comprises a data storage, and the user data is stored in the data storage while a feeder link, which connects the access node to a core network, is unavailable and is forwarded to the core network upon or after the feeder link becomes available.

Example Embodiment 13: A method for a wireless terminal that communicates with an access node on a satellite via a service link, the method comprising:

receiving, from the access node, store and forward (S&F) information comprising:

S&F operation mode status indicating that the access node provides S&F service, and;

access control information, the access control information for the S&F service;

making a decision, based on the S&F information, whether an access attempt is allowed, wherein;

the S&F service comprises storing and forwarding of user data.

Example Embodiment 14: A wireless terminal that communicates with a first access node, the wireless terminal comprising:

receiver circuitry configured to receive, from the first access node, a message comprising:

an instruction to enter an inactive state, and;

context transfer status indicating that a security context of the wireless terminal is transferred to at least one target access node; and;

processor circuitry configured to:

transition, based on the instruction, to the inactive state;

store the security context, and;

upon camping on a cell served by a second access node, determine, based on the context transfer status, whether the security context is transferred to the cell.

Example Embodiment 15: The wireless terminal of Example Embodiment 14, wherein in a case that the stored security context is transferred to the cell, the wireless terminal initiates an access attempt on the cell.

Example Embodiment 16: The wireless terminal of Example Embodiment 14, wherein in a case that the stored security context is not transferred to the cell, the wireless terminal refrains from initiating an access attempt on the cell.

Example Embodiment 17: The wireless terminal of Example Embodiment 14, wherein the context transfer status includes an identity of the at least one target access node.

Example Embodiment 18: The wireless terminal of Example Embodiment 14, wherein the at least one target access node is on a satellite connected wirelessly to a core network via a feeder link, and wherein the satellite is configured to provide a store and forward (S&F) service by storing and forwarding user data while the feeder link is unavailable.

Example Embodiment 19: The wireless terminal of Example Embodiment 14, wherein the security context comprises security keys.

Example Embodiment 20: The wireless terminal of Example Embodiment 14, wherein the message is a release message used to release a connection to the first access node.

Example Embodiment 21: An access node that communicates with a wireless terminal, the access terminal comprising:

processor circuitry configured to generate a message comprising:

an instruction to enter an inactive state;

context transfer status indicating that a security context of the wireless terminal is transferred to at least one target access nodes; and;

transmitter circuitry configured to transmit the message to the wireless terminal;

wherein the context transfer status is configured to be used by the wireless terminal to determine, upon camping on a cell, whether the security context is transferred to the cell.

Example Embodiment 22: The access node of Example Embodiment 21, wherein the context transfer status further indicates an identity of the at least one target access node.

Example Embodiment 23: The access node of Example Embodiment 21, wherein the at least one access node is on a satellite connected wirelessly to a core network via a feeder link, and wherein the satellite is configured to provide a store and forward (S&F) service by storing and forwarding user data while the feeder link is unavailable.

Example Embodiment 24: The access node of Example Embodiment 21, wherein the security context comprises security keys.

Example Embodiment 25: The access node of Example Embodiment 21, wherein the message is a release message used to release a connection to the wireless terminal.

Example Embodiment 26: A method for a wireless terminal that communicates with a first access node, the method comprising:

receiving, from the first access node, a message comprising:

an instruction to enter an inactive state, and;

context transfer status indicating that a security context of the wireless terminal is transferred to at least one target access nodes; and;

transitioning, based on the instruction, to the inactive state;

storing the security context, and;

upon camping on a cell served by a second access node, determining, based on the context transfer status, whether the security context is transferred to the cell.

One or more of the following documents may be pertinent to the technology disclosed herein (all of which are incorporated herein by reference in their entirety):

3GPP TS 24.501 V18.5.0 (2023-12), 3rd Generation Partnership Project; Technical Specification Group Core Network and Terminals; Non-Access-Stratum (NAS) protocol for 5G System (5GS); Stage 3; (Release 18).

3GPP TS 33.401 V17.4.0 (2023-06) 3rd Generation Partnership Project; Technical Specification Group Services and System Aspects; 3GPP System Architecture Evolution (SAE); Security architecture (Release 17)

3GPP TS 33.501 V18.4.0 (2023-12) 3rd Generation Partnership Project; Technical Specification Group Services and System Aspects; Security architecture and procedures for 5G system (Release 18)

3GPP TS 36.331 V18.0.0 (2023-12), 3rd Generation Partnership Project; Technical Specification Group Radio Access Network; Evolved Universal Terrestrial Radio Access (E-UTRA); Radio Resource Control (RRC); Protocol specification (Release 18)

3GPP TS 38.331 V18.0.0 (2023-12), 3rd Generation Partnership Project; Technical Specification Group Radio Access Network; NR; Radio Resource Control (RRC) protocol specification (Release 18)

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal that communicates with an access node on a satellite via a service link, the access node wirelessly communicating with a core network via a feeder link, the wireless terminal comprising:

receiver circuitry configured to receive, from the access node, store and forward (S&F) information comprising:

S&F operation mode status indicating that the access node is operating in an S&F operation mode due to unavailability of the feeder link between the satellite and a ground station, and access control information for limiting use of an S&F service to at least one of selected users, applications, or circumstances;

processor circuitry configured to make, based on the S&F information, a decision as to whether an access attempt is allowed; and transmitter circuitry configured to transmit user data to the access node in a case that the access attempt is allowed, wherein the S&F service comprises:

storing the user data while the feeder link is unavailable, and forwarding the stored user data to the ground station after the feeder link becomes available.

2. The wireless terminal of claim 1, wherein the S&F information is received via broadcasted system information.

3. The wireless terminal of claim 1, wherein the access control information comprises an indication indicating whether an access attempt for an access category assigned to the S&F service is allowed.

4. The wireless node of claim 1, wherein the decision is further made based on whether the S&F service is configured to the wireless terminal.

5. The wireless node of claim 1, wherein the decision is further made based on whether the S&F operation mode status is indicated in the S&F information.

6. An access node on a satellite, the access node communicating with a wireless terminal via a service link and wirelessly communicating with a core network via a feeder link, the access node comprising:

processor circuitry configured to:

detect unavailability of the feeder link, in response to detecting the unavailability, enter a store and forward (S&F) operation mode, in which user data received from the wireless terminal is stored locally, and generate S&F information including:

S&F operation mode status indicating that the access node is operating in the S&F operation mode due to the feeder link being unavailable, and access control information, the access control information for limiting use of an S&F service to at least one of selected users, applications, or circumstances;

transmitter circuitry configured to broadcast the S&F information via the service link; and a data storage configured to store the user data during the S&F operation mode, wherein the transmitter circuitry is further configured to forward the stored user data to the core network after the feeder link becomes available, and wherein the S&F information is configured to be used by the wireless terminal to determine whether an access attempt is allowed during the S&F operation mode.

7. The access node of claim 6, wherein the S&F information is broadcasted in via system information.

8. The access node of claim 6, wherein the access control information comprises an indication as to whether an access attempt for an access category assigned to the S&F service is allowed.

9. The access node of claim 6, wherein the access node further comprises:

receiver circuitry that is configured to receive the user data from the wireless terminal in a case that the access attempt is allowed.

10. A method performed by a wireless terminal that communicates with an access node on a satellite via a service link, the access node wirelessly communicating with a core network via a feeder link, the method comprising:

receiving, from the access node, store and forward (S&F) information comprising:

S&F operation mode status indicating that the access node is operating in an S&F operation mode due to unavailability of the feeder link between the satellite and a ground station, and access control information for limiting use of an S&F service to at least one of selected users, applications, or circumstances;

making, based on the S&F information, a decision as to whether an access attempt is allowed; and transmitting user data to the access node in a case that the access attempt is allowed, wherein the S&F service comprises;

storing the user data while the feeder link is unavailable, and forwarding the stored user data to the ground station after the feeder link becomes available.

* * * * *